(12) United States Patent
Kawada et al.

(10) Patent No.: US 8,875,499 B2
(45) Date of Patent: Nov. 4, 2014

(54) UREA SOLUTION REFORMER AND EXHAUST GAS PURIFIER USING SAME

(75) Inventors: Yoshihiro Kawada, Kanagawa (JP); Shinya Sato, Tokyo (JP); Mitsuru Hosoya, Tokyo (JP); Kazunori Takahashi, Tokyo (JP); Hiroshi Inoue, Tokyo (JP)

(73) Assignees: Hino Motors Ltd., Tokyo (JP); HKT Corporation, Tokyo (JP)

( * ) Notice: Subject to any disclaimer, the term of this patent is extended or adjusted under 35 U.S.C. 154(b) by 0 days.

(21) Appl. No.: 14/005,096

(22) PCT Filed: Mar. 14, 2012

(86) PCT No.: PCT/JP2012/056543
§ 371 (c)(1),
(2), (4) Date: Nov. 6, 2013

(87) PCT Pub. No.: WO2012/128145
PCT Pub. Date: Sep. 27, 2012

(65) Prior Publication Data
US 2014/0047821 A1    Feb. 20, 2014

(30) Foreign Application Priority Data

Mar. 18, 2011   (JP) .................... 2011-061154
Dec. 28, 2011   (JP) .................... 2011-287957

(51) Int. Cl.
*F01N 3/00*    (2006.01)
(Continued)

(52) U.S. Cl.
CPC ............. *F01N 3/10* (2013.01); *F01N 2610/14* (2013.01); *Y02T 10/24* (2013.01); *F01N 3/2066* (2013.01); *F01N 2610/06* (2013.01); *B01J 29/072* (2013.01); *F01N 2610/08* (2013.01); *B01J 37/0246* (2013.01); *B01J 35/04* (2013.01); *F01N 2610/1453* (2013.01); *F01N 2610/02* (2013.01); *F01N 2240/40* (2013.01); *F01N 2610/10* (2013.01)

USPC ............... 60/295; 60/286; 60/299; 60/300; 60/301

(58) Field of Classification Search
USPC .................... 60/286, 295, 299, 300, 301
See application file for complete search history.

(56) References Cited

U.S. PATENT DOCUMENTS 6,878,359 B1    4/2005 Mathes et al.
2006/0048503 A1*   3/2006 Havers ......................... 60/286
(Continued)

FOREIGN PATENT DOCUMENTS

JP    2002-514495    5/2002
JP    2004-867       1/2004
(Continued)

OTHER PUBLICATIONS

International Preliminary Report on Patentability and English language translation thereof, mail date is Oct. 3, 2013.

(Continued)

*Primary Examiner* — Audrey K Bradley
*Assistant Examiner* — Dapinder Singh
(74) *Attorney, Agent, or Firm* — Greenblum & Bernstein, P.L.C.

(57) ABSTRACT

A urea solution reformer and an exhaust gas purifier is configured to heat a carrier gas supplied from a carrier gas source by a carrier gas heating unit, to inject the carrier gas heated by the carrier gas heating unit from a carrier gas injecting nozzle, and to cause a urea solution to be supplied by a first urea solution supply nozzle to a tip end of the carrier gas injecting nozzle so that the urea solution is atomized by the carrier gas injected from the carrier gas injecting nozzle. Provided to face toward the carrier gas injecting nozzle is a catalyst unit for decomposing the atomized urea solution to reform it into an ammonia gas. An ammonia gas supply nozzle is attached to an exhaust pipe of an engine so as to supply the ammonia gas discharged from an outlet of the catalyst unit into the exhaust pipe.

12 Claims, 17 Drawing Sheets

(51) Int. Cl.
  *F01N 3/02* (2006.01)
  *F01N 3/20* (2006.01)
  *B01J 21/06* (2006.01)
  *B01J 29/072* (2006.01)
  *C01C 1/08* (2006.01)
  *F01N 3/08* (2006.01)
  *F01N 3/10* (2006.01)
  *B01J 37/02* (2006.01)
  *B01J 35/04* (2006.01)

(56) References Cited

U.S. PATENT DOCUMENTS

| | | | |
|---|---|---|---|
| 2006/0075743 A1* | 4/2006 | Li et al. | 60/286 |
| 2006/0213187 A1* | 9/2006 | Kupe et al. | 60/286 |
| 2009/0120078 A1 | 5/2009 | Bruck et al. | |
| 2009/0127511 A1 | 5/2009 | Bruck et al. | |
| 2009/0223221 A1 | 9/2009 | Onishi et al. | |
| 2009/0301068 A1 | 12/2009 | Fujita et al. | |
| 2011/0023470 A1 | 2/2011 | Bruck et al. | |
| 2013/0115145 A1* | 5/2013 | Umemoto et al. | 422/170 |

FOREIGN PATENT DOCUMENTS

| | | |
|---|---|---|
| JP | 2005-344597 | 12/2005 |
| JP | 2008-75527 | 4/2008 |
| JP | 2009-537723 | 10/2009 |
| JP | 2009-537725 | 10/2009 |
| JP | 2009-264148 | 11/2009 |
| JP | 2009-293513 | 12/2009 |
| JP | 2010-506078 | 2/2010 |
| WO | 2009/109423 | 9/2009 |

OTHER PUBLICATIONS

International Search Report, mail date is Jun. 12, 2012.

* cited by examiner

UREA SOLUTION REFORMER AND EXHAUST GAS PURIFIER USING SAME

TECHNICAL FIELD

The present invention relates to a reformer for decomposing a urea solution to reform it into an ammonia gas or ammonia water, and a device configured to use the ammonia gas or ammonia water reformed by the reformer as a reducing agent to purify $NO_x$ in an exhaust gas from an engine.

BACKGROUND ART

Conventionally, there has been disclosed an exhaust gas $NO_x$ removal device comprising: supply means configured to supply a reducing agent for nitrogen oxides, and provided in a flow passage of a nitrogen oxide-containing exhaust gas; and an exhaust gas $NO_x$ removal unit provided at a downstream side of the supply means (see Patent Document 1, for example). In this exhaust gas $NO_x$ removal device, the supply means of the reducing agent includes: a urea solution ejecting unit for ejecting a urea solution; an evaporating unit for evaporating the urea solution ejected by the urea solution ejecting unit; a hydrolyzing unit provided at a downstream side of the evaporating unit in a manner to decompose the urea solution into an ammonia gas; and a reducing agent injecting unit for injectingly supplying the ammonia-containing gas into the exhaust gas. The device further comprises a heater(s) provided at the evaporating unit, or at the evaporating unit and the hydrolyzing unit. Further, the urea solution ejecting unit, evaporating unit, hydrolyzing unit, and reducing agent injecting unit (decomposed gas outlet portion) are provided in this order within a cylindrical vessel to thereby constitute a urea evaporator.

In the exhaust gas $NO_x$ removal device as constituted above, when the cylindrical vessel constituting the urea evaporator is uniformly heated in a manner to blow thereinto a urea solution (urea concentration between 30% and 50%), water and urea are caused to evaporate within the vessel, such that the urea is decomposed at surfaces of catalyst particles such as γ-alumina particles, potassium carbonate-carrying particles, or the like filled in the vessel, thereby producing an ammonia gas. Here, the evaporator has an interior structure configured to keep 450° C. or higher to thereby promote rapid evaporation by heating, so as to prevent production of solid by-products such as cyanuric acid, isocyanic acid, and the like to be otherwise produced in the process of thermal decomposition of urea. In other words, the structure of the evaporator is elaborated to promote heat transfer at an evaporating surface, in a manner to be capable of restricting a temperature fluctuation within the vessel even at a considerable fluctuation of a flow rate of injected urea. Specifically, the structure of the evaporator is filled, at an upper side (or upstream side) of γ-alumina particles or the like filled in the hydrolyzing unit, with silicon carbide, iron or stainless balls, metal honeycomb, or the like, which are better in thermal conductivity than the γ-alumina particles.

Further, there has been disclosed a device for producing a gas flow containing a reducing agent (hereinafter called "reducing agent-containing gas flow producing device") comprising: a duct having a first zone for partially evaporating a reducing agent precursor to produce a gas flow, and a second zone for partially heating the gas flow, wherein the duct is provided with: transporting means for supplying the reducing agent precursor; means for converting the reducing agent precursor in the gas flow into a reducing agent; and heating elements for heating the first zone to a first temperature and heating the second zone to a second temperature, respectively (see Patent Document 2, for example).

In the reducing agent-containing gas flow producing device as constituted above, the transporting means supplies the reducing agent precursor to the duct, the heating element positioned in the first zone evaporates the reducing agent precursor to produce a gas flow, and thereafter the heating element positioned in the second zone partially heats the gas flow up to a temperature of 250° C. to partially convert the reducing agent precursor in the gas flow into a reducing agent, thereby producing a reducing agent-containing gas flow. The reducing agent-containing gas flow produced in the reducing agent-containing gas flow producing device is introduced into an exhaust line of an internal combustion engine, and is mixed there with an exhaust gas flow of the internal combustion engine. The device is configured so that the mixed gas of the reducing agent-containing gas flow and exhaust gas flow is caused to flow through an SCR catalyst converter such that nitrogen oxides contained in the exhaust gas flow are converted by the reducing agent, thereby decreasing a content ratio of $NO_x$ in the exhaust gas.

In turn, there has been disclosed a mixed gas supplying device including a reservoir of a water solution (urea water solution, for example) containing at least one kind of reducing agent precursor substance, wherein the reservoir is connected to an evaporating chamber, the water solution is supplied to the evaporating chamber by supplying means, and the mixed gas contains at least one substance comprising at least one kind of reducing agent or at least one kind of reducing agent precursor substance (see Patent Document 3, for example). This mixed gas supplying device further includes heating means arranged for the evaporating chamber and formed of a heating wire contacted with the evaporating chamber, such that the urea solution in the evaporating chamber is heated to a temperature at or above a critical temperature where the urea water solution is caused to be at least partially evaporated by the heating means. Specifically, an evaporating device has the evaporating chamber having a substantially closed volume, and the evaporating chamber has a first opening for connecting a delivery line for delivering a urea water solution, and a second opening for connecting a supply line for discharging the mixed gas therefrom. Arranged at the first opening is a nozzle as means for injectingly supplying a urea water solution into the evaporating chamber, so that the nozzle injects the urea water solution into the evaporating chamber. Further, the evaporating chamber includes, at the site of the second opening, means for preventing invasion of droplets into the second opening, particularly, means (such as a protrusion at a wall) for breaking a gas film situated between droplets and a wall of the evaporating chamber, and the evaporating chamber includes therein one or more structures serving to produce a larger surface for evaporating the urea water solution. This structure(s) may be a structured surface to be obtained by applying a coating to the inner surface of the evaporating chamber. Further, the evaporating chamber is connected to a hydrolysis catalytic converter via the second opening, and this hydrolysis catalytic converter is directly connected to an exhaust pipe. This hydrolysis catalytic converter has temperature controlling means comprising a heating wire wound around the hydrolysis catalytic converter itself.

The mixed gas supplying device constituted in the above manner is configured to produce a mixed gas from a urea water solution by the evaporating device, and the mixed gas contains at least urea, and already contains ammonia produced by virtue of thermal decomposition of the urea in an occasional manner. This mixed gas is introduced into the hydrolysis catalytic converter through the second opening, in a manner to conduct substantially complete hydrolysis of the urea into the ammonia at the hydrolysis catalytic converter, thereby producing a reducing agent mixed gas containing ammonia.

Meanwhile, there has been disclosed an apparatus for treating exhaust gas of an internal combustion engine, where a hydrolytic catalyst is connected to at least one feed line for feeding a water solution containing urea, an exhaust gas flows through an SCR catalyst, and a rod-shaped heating element for heating at least one of at least part of the feed line and the hydrolytic catalyst is arranged (see Patent Document 4, for example). In this exhaust gas treating apparatus, at least one of at least part of the feed line and the hydrolytic catalyst is arranged around the rod-shaped heating element. The rod-shaped heating element is surrounded by a casing tube, which is formed in one piece with the rod-shaped heating element or connected to the rod-shaped heating element by a material connection. The casing tube is provided with a channel therein. Here, the channel comprises one or more channels, each formed in a substantially spiral shape around the rod-shaped heating element and each having an annular gap cross-section internally delimited by the casing tube and externally delimited by the sleeve. The rod-shaped heating element is configured to evaporate a urea water solution at a first zone of the channel, in a manner to cause a mixed gas to flow through a second zone of the channel. Provided at the second zone of the channel is a coating for promoting hydrolysis of urea into ammonia, so that the second zone of the channel is used as a hydrolyzing channel and as a hydrolytic catalyst. After hydrolysis of urea into ammonia, a vapor stream containing ammonia is supplied as a reducing agent from the channel into an exhaust pipe. Further, the sleeve is pushed over the casing tube. This sleeve may, for example, itself have suitable heat conductors, so that the sleeve is also heatable, and the channel is thus heated from both outside and inside.

PRIOR ART DOCUMENT

Patent Document

Patent Document 1: JP2004-000867A (claims 1, 2, and 6, paragraph [0012], paragraph [0013], and FIG. 1)
Patent Document 2: JP2010-506078A (claims 1 and 7, paragraph [0047], and FIG. 1 and FIG. 2)
Patent Document 3: JP2009-537723A (claim 1, paragraphs to [0065], and FIG. 5 and FIG. 6)
Patent Document 4: JP2009-537725A (claim 1, paragraphs [0027], [0047], [0048], and FIG. 1 and FIG. 4)

DISCLOSURE OF THE INVENTION

Problem to be Solved by the Invention

However, in the conventional exhaust gas NO removal device disclosed in the Patent Document 1, the urea solution is injected at a lower pressure and air is used for cooling, thereby causing such a possibility that the urea solution is not sufficiently atomized. Further, in the conventional reducing agent-containing gas flow producing device disclosed in the Patent Document 2, the urea solution is caused to flow through the duct, thereby causing such a possibility that the urea solution is adhered onto an inner wall of the duct and is thus prevented from smoothly flowing through the interior of the duct.

Further, in both of the conventional mixed gas supplying device disclosed in the Patent Document 3 and the conventional exhaust gas treating apparatus disclosed in the Patent Document 4, the urea water solution in a liquid state is once evaporated and then hydrolyzed to thereby produce a reducing agent comprising a mixed gas or vapor stream containing ammonia, thereby bringing about such a problem that the supplying amount of the reducing agent into an exhaust pipe is largely fluctuated due to fluctuation of the pressure to make it difficult to control a supplying amount of the reducing agent into the exhaust pipe. In case of the conventional mixed gas supplying device disclosed in the Patent Document 3, the urea water solution flowed into the evaporating chamber is intended to be evaporated to produce a mixed gas containing urea and ammonia, and the thus produced mixed gas flows into the hydrolysis catalytic converter such that the urea in the mixed gas is substantially completely hydrolyzed there and then the resultant mixed gas flows into the exhaust pipe, thereby possibly causing such an occasion that the urea in the urea water solution is not evaporated in the evaporating chamber while only water is evaporated there to thereby crystallize the urea, where the crystallized urea is deposited on an inner surface of the evaporating chamber. Moreover, in case of the conventional mixed gas supplying device disclosed in the Patent Document 3, the evaporating chamber and the hydrolysis catalytic converter are separately provided to produce a reducing agent mixed gas containing ammonia from a urea water solution, thereby problematically increasing the number of constituent parts, and requiring to ensure a wider installation space for the evaporating chamber and hydrolysis catalytic converter.

In turn, in the conventional exhaust gas treating apparatus disclosed in the Patent Document 4, the urea water solution flowed into the channel of the hydrolytic catalyst is intended to be evaporated in the first zone of the channel, then hydrolyzed in the second zone of the channel, and finally turned into a vapor stream containing ammonia which stream is to flow into an exhaust pipe, thereby possibly causing such an occasion that the urea in the urea water solution is not evaporated in the first zone of the channel while only water is evaporated there to thereby crystallize the urea, where the crystallized urea is deposited in the channel in a manner to clog the channel by the thus deposited matter. Further, in the conventional exhaust gas treating apparatus disclosed in the Patent Document 4, the channel of the hydrolytic catalyst comprises one or more channels, each formed in a substantially spiral shape around the rod-shaped heating element and each having an annular gap cross-section internally delimited by the casing tube and externally delimited by the sleeve, thereby bringing about such a problem that the casing tube and the sleeve are required to be fabricated with higher precision in a manner to increase the number of fabrication steps for these constituent parts.

It is therefore a first object of the present invention to provide a urea solution reformer which is capable of sufficiently atomizing a urea solution to thereby reform the urea solution into an ammonia gas at a catalyst unit with a good efficiency. It is a second object of the present invention to provide a urea solution reformer which is capable of allowing to relatively easily mount a reformer housing together with an ammonia gas supply nozzle to an exhaust pipe. It is a third object of the present invention to provide a urea solution reformer which reformer is capable of sufficiently ensuring a carrier gas flow passage in a carrier gas heating unit to sufficiently heat the carrier gas at the carrier gas heating unit, and which reformer is configured to cause only a carrier gas to flow through the carrier gas flow passage of the carrier gas heating unit without flow of a urea solution therethrough, thereby enabling to prevent adherence of the urea solution onto an inner wall of the carrier gas flow passage and enabling to allow the carrier gas to smoothly flow through the carrier gas flow passage. It is a fourth object of the present invention to provide a urea solution reformer, which is capable of increasing a produced amount of an ammonia gas and preventing inflow of urea solution into an exhaust pipe by causing droplets of the urea solution to collide with a dispersion plate even when the atomized urea solution has passed through a catalyst unit. It is a fifth object of the present invention to provide a urea solution reformer, which is configured to directly heat a catalyst unit by catalyst heating means, thereby enabling to improve a reformation efficiency from an atomized urea solution into an ammonia gas at the catalyst unit.

It is a sixth object of the present invention to provide an exhaust gas purifier utilizing the urea solution reformer, which is capable of decreasing $NO_x$ with a good efficiency even at a lower temperature of exhaust gas. It is a seventh object of the present invention to provide an exhaust gas purifier, which is capable of readily controlling a supplying amount of an ammonia water into an exhaust pipe, by reforming a urea solution into the ammonia water by the urea solution reformer without evaporating the urea solution. It is an eighth object of the present invention to provide an exhaust gas purifier, which is capable of preventing urea from being crystallized due to evaporation of water only, by reforming a urea solution into the ammonia water by a urea solution reformer without evaporating the urea solution. It is a ninth object of the present invention to provide an exhaust gas purifier, which is capable of achieving a downsized urea solution reformer without increasing the number of constituent parts of the urea solution reformer, by reforming a urea solution in a liquid state into an ammonia water in a liquid state by the urea solution reformer. It is a tenth object of the present invention to provide an exhaust gas purifier, which is capable of allowing a reducing agent flow pipe to be fabricated relatively readily with a relatively lower precision without increasing the number of fabrication steps therefor, by helically winding the reducing agent flow pipe around an outer peripheral surface of a rod-shaped heater.

Means for Solving Problem

According to a first aspect as shown in FIG. 1 and FIG. 2, the present invention resides in a urea solution reformer, comprising: a carrier gas heating unit 16 for heating a carrier gas supplied from a carrier gas source 14; a carrier gas injecting nozzle 17 for injecting the carrier gas heated by the carrier gas heating unit 16; a first urea solution supply nozzle 21 for supplying a urea solution 18 to a tip end of the carrier gas injecting nozzle 17 so that the urea solution 18 is atomized by the carrier gas injected from the carrier gas injecting nozzle 17; a catalyst unit 23 provided to face toward the carrier gas injecting nozzle 17, to decompose the atomized urea solution 18 to reform it into an ammonia gas 22; and an ammonia gas supply nozzle 24 attached to an exhaust pipe 12 of an engine 11 so as to supply the ammonia gas 22 discharged from an outlet of the catalyst unit 23 into the exhaust pipe 12.

According to a second aspect, the present invention resides in the invention based on the first aspect, and shown in FIG. 1, wherein the carrier gas heating unit 16, the carrier gas injecting nozzle 17, the first urea solution supply nozzle 21, and the catalyst unit 23 are accommodated in the reformer housing 26, and wherein the reformer housing 26 is connected to a proximal end of the ammonia gas supply nozzle 24.

According to a third aspect, the present invention resides in the invention based on the first or second aspect, and shown in FIG. 1, wherein the carrier gas heating unit 16 comprises: a coil holding portion 16a formed in a columnar shape; an electrothermal coil 16b buried in and along an outer peripheral surface of the coil holding portion 16a such that the electrothermal coil 16b is not exposed on the outer peripheral surface of the coil holding portion 16a; and a carrier gas flow passage-oriented coil 16c helically wound around the outer peripheral surface of the coil holding portion 16a, so as to define a carrier gas flow passage 16d for causing the carrier gas to helically flow along the outer peripheral surface of the coil holding portion 16a.

According to a fourth aspect, the present invention resides in the invention based on the first or second aspect, and shown in FIG. 1, wherein the urea solution reformer further comprises a dispersion plate 31/32 with multiple through-holes 31a/32a and provided at an outlet side of the catalyst unit 23 to oppose to an outlet face of the catalyst unit 23, in a manner to receive the urea solution 18 discharged from the catalyst unit 23.

According to a fifth aspect, the present invention resides in the invention based on the first or second aspect, and shown in FIG. 1, wherein the urea solution reformer further comprises catalyst heating means 41/42 inserted in the catalyst unit 23 and being capable of directly heating the catalyst unit 23.

According to a sixth aspect as shown in FIG. 1 and FIG. 2, the present invention resides in an exhaust gas purifier adopting the urea solution reformer 13 according to any one of first to fifth aspects, where the exhaust gas purifier is comprising: a selective catalytic reduction catalyst 51 provided in an exhaust pipe 12 of the engine 11, and being capable of reducing $NO_x$ in the exhaust gas into $N_2$; the urea solution reformer 13, including the ammonia gas supply nozzle 24 engaged into the exhaust pipe 12 at an exhaust-gas upstream side of the selective catalytic reduction catalyst 51, in a manner to supply an ammonia gas 22 acting as a reducing agent for the selective catalytic reduction catalyst 51, from the ammonia gas supply nozzle 24 into the exhaust pipe 12; urea solution supply means 53 including a second urea solution supply nozzle 52 engaged into the exhaust pipe 12 at an exhaust-gas upstream side of the selective catalytic reduction catalyst 51 and at an exhaust-gas upstream side or exhaust-gas downstream side of the first ammonia gas supply nozzle 24, so as to supply the urea solution 18 from the second urea solution supply nozzle 52 into the exhaust pipe 12 at the selective catalytic reduction catalyst 51; a temperature sensor 54 for detecting a temperature of the exhaust gas related to the selective catalytic reduction catalyst 51; and a controller 56 for controlling the urea solution reformer 13 and the urea solution supply means 53, based on a detection output of the temperature sensor 54.

According to a seventh aspect as shown in FIG. 7 and FIG. 8, the present invention resides in an exhaust gas purifier for purifying an exhaust gas of an engine 11, comprising: a selective catalytic reduction catalyst 51 provided in an exhaust pipe 12 of the engine 11, and being capable of reducing $NO_x$ in the exhaust gas into $N_2$; a urea solution reformer 214 for heating a urea solution 18 by a heater 214b to reform the urea solution into an ammonia water; urea solution supply means 216 for supplying the urea solution 18 to the urea solution reformer 214; an injecting nozzle 217 engaged into the exhaust pipe 12 at an exhaust-gas upstream side of the selective catalytic reduction catalyst 51, and being capable of injecting one or both of an ammonia water reformed by the urea solution reformer 214, and the urea solution passed through the urea solution reformer 214 without being reformed thereby; a catalyst temperature sensor 233 for detecting a temperature of the exhaust gas related to the selective catalytic reduction catalyst 51; a pressure sensor 234 for detecting an inlet pressure of the urea solution reformer 214; and a controller 56 for controlling the heater 214b and the urea solution supply means 216, based on the respective detection outputs of the catalyst temperature sensor 233 and the pressure sensor 234.

According to an eighth aspect, the present invention resides in the invention based on the seventh aspect, and shown in FIG. 8, wherein the urea solution reformer 214 comprises: a reformation casing 214a in a cylindrical shape; a heater 214b helically wound around an outer peripheral surface of the reformation casing 214a; and multiple inorganic porous bodies 214c filled in the reformation casing 214a, thereby transmitting a heat of the heater 214b into the interior of the reformation casing 214a.

According to a ninth aspect, the present invention resides in the invention based on the eighth aspect, and shown in FIG. 11, wherein the urea solution reformer further comprises partition plates 264f provided in the reformation casing 264a at predetermined intervals in a longitudinal direction of the reformation casing; wherein the interior of the reformation casing 264a is divided by the partition plates 264f into multiple spaces communicated with one another; wherein the multiple inorganic porous bodies 264c are filled in the multiple spaces; and wherein the urea solution reformer is so configured that the urea solution flowed into the reformation casing 264a is caused to pass therethrough while meandering through the multiple spaces, in a manner to be reformed into the ammonia water.

According to a tenth aspect, the present invention resides in the invention based on the eighth or ninth aspect, and shown in FIG. 8, wherein the inorganic porous bodies 214c carry thereon catalysts, for promoting hydrolysis of the urea solution 18.

According to an eleventh aspect, the present invention resides in the invention based on the seventh aspect, and shown in FIG. 13 and FIG. 16, wherein the urea solution reformer 284 includes: a heater 284a in a rod shape; a reducing agent flow pipe 284b helically wound around an outer peripheral surface of the heater 284a, and configured to allow a urea solution to flow through the pipe itself and configured to transmit a heat of the heater 284a to an inner surface of the pipe itself; and an adsorbent layer 284c coated on an inner peripheral surface of the reducing agent flow pipe 284b, to adsorb the urea solution.

According to a twelfth aspect, the present invention resides in the invention based on the eleventh aspect, and shown in FIG. 16, wherein the adsorbent layer 284c carries thereon a catalyst for promoting hydrolysis of the urea solution.

Effect of the Invention

In case of the urea solution reformer according to the first aspect of the present invention, the carrier gas supplied from the carrier gas source is heated by the carrier gas heating means, the thus heated carrier gas is injected from the carrier gas injecting nozzle, the urea solution supplied from the first urea solution supply nozzle is atomized by the carrier gas injected from the carrier gas injecting nozzle, and the thus atomized urea solution is decomposed and reformed into an ammonia gas by the catalyst unit, thereby enabling to reform the urea solution into the ammonia gas by the catalyst unit with a good efficiency. Further, the urea solution is injected from the urea solution ejecting unit at a relatively lower temperature, thereby enabling to sufficiently atomize the urea solution in the present invention, as compared to the conventional exhaust gas $NO_x$ removal device which is incapable of sufficiently atomizing a urea solution.

In case of the urea solution reformer according to the second aspect of the present invention, the carrier gas heating unit, carrier gas injecting nozzle, first urea solution supply nozzle, and catalyst unit are accommodated in the reformer housing, and this reformer housing is connected to the proximal end of the ammonia gas supply nozzle, thereby enabling to relatively easily mount the reformer housing together with the ammonia gas supply nozzle to the exhaust pipe.

In case of the urea solution reformer according to the third aspect of the present invention, the coil holding portion having a higher thermal conductivity is formed in the columnar shape; the electrothermal coil is buried in and along the outer peripheral surface of the coil holding portion such that the electrothermal coil is not exposed on the outer peripheral surface of the coil holding portion; and the carrier gas flow passage-oriented coil is helically wound around the outer peripheral surface of the coil holding portion, so as to form the carrier gas flow passage for causing the carrier gas to helically flow along the outer peripheral surface of the coil holding portion; thereby enabling to sufficiently ensure the carrier gas flow passage at the carrier gas heating unit. As a result, the carrier gas can be sufficiently heated by the carrier gas heating unit. Further, as compared to the conventional reducing agent-containing gas flow producing device where the urea solution is caused to flow through the duct so that the urea solution is adhered onto an inner wall of the duct and is thus prevented from smoothly flowing through the interior of the duct, the urea solution reformer of the present invention is configured to cause only the carrier gas to flow through the carrier gas flow passage without flow of a urea solution therethrough, thereby enabling to prevent adherence of the urea solution onto an inner wall of the carrier gas flow passage. As a result, the carrier gas is allowed to smoothly flow through the carrier gas flow passage.

In case of the urea solution reformer according to the fourth aspect of the present invention, the dispersion plate having a higher thermal conductivity with multiple through-holes and configured to receive the urea solution discharged from the catalyst unit is provided at the outlet side of the catalyst unit to oppose to the outlet face of the catalyst unit, so that, even when the atomized urea solution has passed through the catalyst unit without being reformed thereby into the ammonia gas, the urea solution is brought to collide with the dispersion plate. Droplets of the urea solution collided with the dispersion plate absorb a heat from the dispersion plate and are thus decomposed into the ammonia gas, thereby enabling to increase a produced amount of the ammonia gas, and to prevent the urea solution from flowing into the exhaust pipe.

Incase of the urea solution reformer according to the fifth aspect of the present invention, the catalyst heating means directly heats the catalyst unit, such that the temperature of the catalyst unit is kept at the temperature capable of reforming the atomized urea solution into the ammonia gas. This resultingly enables to improve a reformation efficiency from the atomized urea solution into the ammonia gas at the catalyst unit.

In case of the exhaust gas purifier according to the sixth aspect of the present invention, when the temperature sensor has detected that the exhaust gas temperature is low, the controller keeps the urea solution supply means in a deactivated state and activates the urea solution reformer. Thus, after the urea solution reformer has decomposed the urea solution and reformed it into an ammonia gas, this ammonia gas is supplied from the ammonia gas supply nozzle into the exhaust pipe. When the ammonia gas together with the exhaust gas is caused to flow into the selective catalytic reduction catalyst, the ammonia gas acts as a reducing agent for reducing $NO_x$ in the exhaust gas, so that $NO_x$ in the exhaust gas is quickly reduced into $N_2$. As a result, it is enabled to decrease an amount of $NO_x$ with a good efficiency, even when the exhaust gas temperature is low. In turn, when the temperature sensor has detected that the exhaust gas temperature is relatively high, the controller deactivates the urea solution reformer, and activates the urea solution supply means. This causes the second urea solution supply nozzle of the urea solution supply means to inject a urea solution into the exhaust pipe. At this time, the exhaust gas temperature is relatively high, so that the urea solution is quickly decomposed into an ammonia gas within the exhaust pipe. When the ammonia gas is caused to flow into the selective catalytic reduction catalyst together with the exhaust gas, the ammonia gas acts as a reducing agent for reducing $NO_x$ in the exhaust gas, so that $NO_x$ in the exhaust gas is quickly reduced into $N_2$. As a result, it is enabled to decrease an amount of $NO_x$ with a good efficiency, even when the exhaust gas temperature is raised.

In case of the exhaust gas purifier according to the seventh aspect of the present invention, the urea solution is reformed, without being evaporated, into an ammonia water by the urea solution reformer, and one or both of the ammonia water and the urea solution, which are substantially unchanged in volume even upon change of pressure, is/are injected from the injecting nozzle into the exhaust pipe, thereby enabling to readily control a supplying amount of the ammonia water or urea solution into the exhaust pipe. Further, the ammonia water injected from the injecting nozzle into the exhaust pipe is quickly vaporized and turned into an ammonia gas even when the exhaust gas is at a relatively lower temperature, and this ammonia gas acts as a reducing agent, on the selective catalytic reduction catalyst, for reducing $NO_x$ in the exhaust gas into $N_2$, thereby enabling to decrease $NO_x$ in the exhaust gas with a good efficiency even when the exhaust gas temperature is relatively low. It is noted that, when the exhaust gas temperature is relatively high, the urea solution is passed through the urea solution reformer, without being reformed thereby, and injected from the injecting nozzle into the exhaust pipe. The thus injected urea solution is reformed into an ammonia gas by the exhaust gas at the relatively high temperature, so that the ammonia gas acts as a reducing agent, on the selective catalytic reduction catalyst, for reducing $NO_x$ in the exhaust gas into $N_2$.

Further, the urea solution is reformed, without being evaporated, into an ammonia water by the urea solution reformer, thereby enabling to prevent urea from being crystallized due to evaporation of water only. This resultingly enables to prevent deposition of otherwise crystallized urea in the urea solution reformer. Moreover, as compared to the conventional mixed gas supplying device where the evaporating chamber and the hydrolysis catalytic converter are separately provided to produce a reducing agent mixed gas containing ammonia from a urea water solution, thereby problematically increasing the number of constituent parts, and requiring to ensure a wider installation space for the evaporating chamber and hydrolysis catalytic converter; the present invention is configured to reform the urea solution in a liquid state into the ammonia water in a liquid state by the single urea solution reformer, thereby enabling to achieve a downsized urea solution reformer without increasing the number of constituent parts of the urea solution reformer. As a result, the urea solution reformer can be installed in a relatively narrow space.

In case of the exhaust gas purifier according to the eighth aspect of the present invention, the inorganic porous bodies filled in the reformation casing cooperatively exhibit a function as a thermal medium for transmitting a heat of the heater into the interior of the reformation casing, and a function as an adsorbent for adsorbing the urea solution in a soaking manner, thereby enabling to reform the urea solution into the ammonia water with a good efficiency.

In case of the exhaust gas purifier according to the ninth aspect of the present invention, the urea solution flowed into the reformation casing is caused to pass therethrough while meandering through the multiple spaces, in a manner to increase a ratio of contact of the urea solution with the inorganic porous bodies, thereby enabling to reform the urea solution into an ammonia water with a better efficiency.

In case of the exhaust gas purifier according to the tenth aspect of the present invention, the catalysts carried on the inorganic porous bodies promote hydrolysis of the urea solution, thereby enabling to reform the urea solution into the ammonia water with a better efficiency.

In case of the exhaust gas purifier according to the eleventh aspect of the present invention, the reducing agent flow pipe transmits the heat of the heater to the inner surface of the reducing agent flow pipe itself, and the adsorbent layer adsorbs the urea solution, thereby enabling to reform the urea solution into an ammonia water with a good efficiency by causing the urea solution to pass through the reducing agent flow pipe. Further, as compared to the conventional exhaust gas treating apparatus where the casing tube and the sleeve are required to be fabricated with higher precision in a manner to increase the number of fabrication steps for these constituent parts, it is enough in the present invention to helically wind the reducing agent flow pipe around the outer peripheral surface of the rod-like heater, thereby allowing to relatively easily fabricate the reducing agent flow pipe with a relatively lower precision without increasing the number of fabrication steps.

In case of the exhaust gas purifier according to the twelfth aspect of the present invention, the catalyst carried on the adsorbent layer promotes hydrolysis of the urea solution, thereby enabling to reform the urea solution into an ammonia water with a better efficiency.

EMBODIMENTS OF THE INVENTION

Embodiments for carrying out the present invention will be described hereinafter with reference to the accompanying drawings.

First Embodiment

Figure 1:
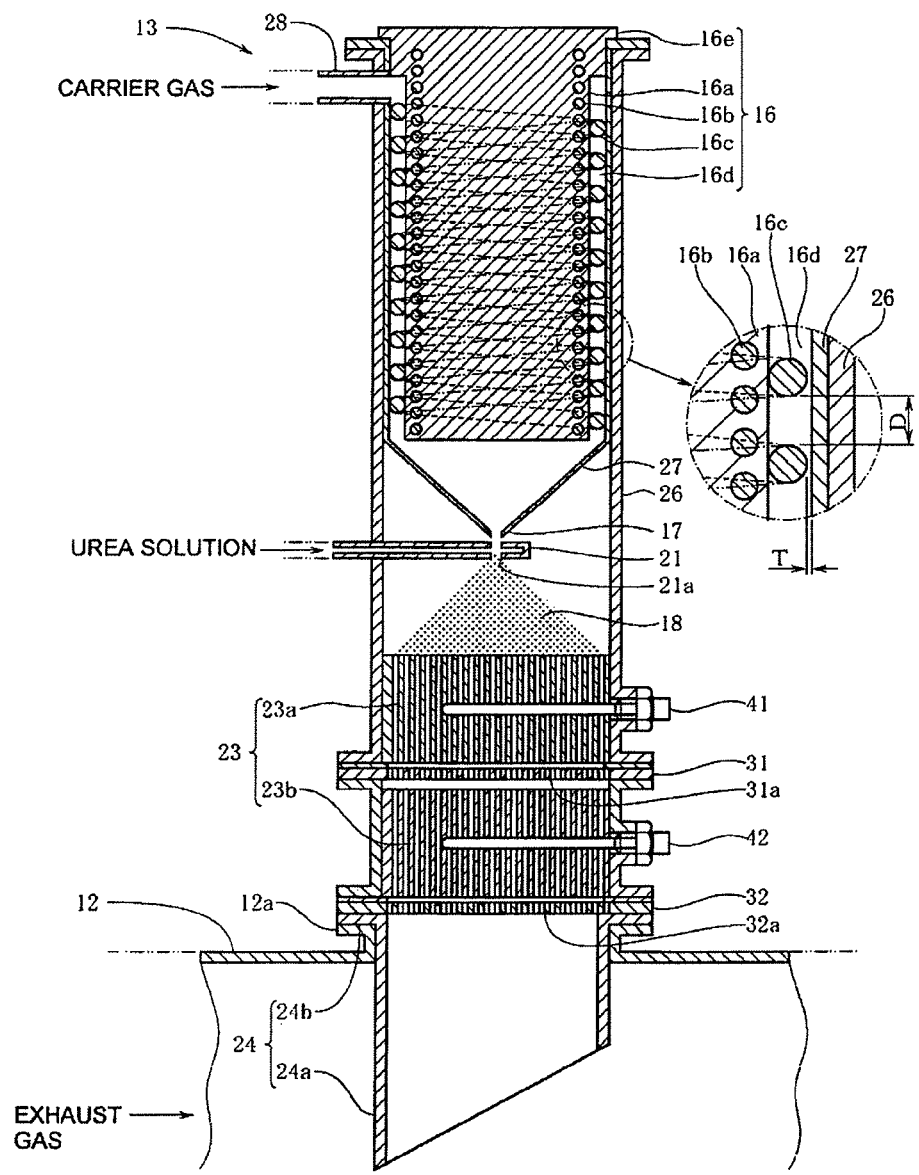
FIG. 1 is a longitudinal constitutional cross-sectional view of a urea solution reformer according to a first embodiment of the present invention.
Figure 2:
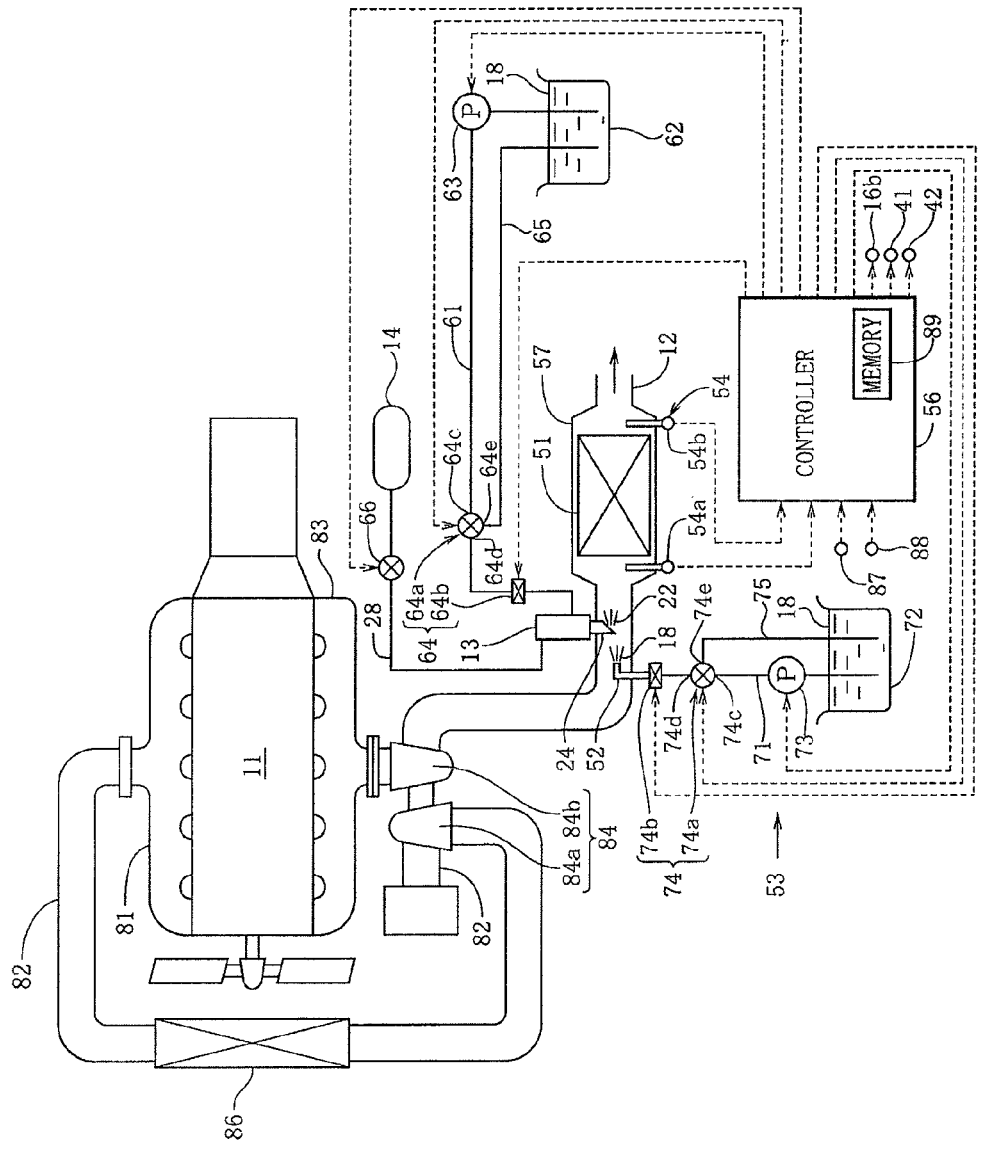
FIG. 2 is a constitutional view of an exhaust gas purifier adopting the urea solution reformer.

FIG. 1 and FIG. 2 show a urea solution reformer 13 provided in an exhaust pipe 12 of a diesel engine 11. This urea solution reformer 13 includes: a carrier gas heating unit 16 for heating a carrier gas supplied from a carrier gas source 14; a carrier gas injecting nozzle 17 for injecting the carrier gas heated by the carrier gas heating unit 16; a first urea solution supply nozzle 21 for supplying a urea solution 18 to a tip end of the carrier gas injecting nozzle 17 so that the urea solution 18 is atomized by the carrier gas injected from the carrier gas injecting nozzle 17; a catalyst unit 23 for decomposing the atomized urea solution 18 to reform it into an ammonia gas 22; and an ammonia gas supply nozzle 24 for supplying, the ammonia gas 22 discharged from an outlet of the catalyst unit 23, into the exhaust pipe 12 of the engine 11. The carrier gas heating unit 16, carrier gas injecting nozzle 17, first urea solution supply nozzle 21, and catalyst unit 23 are accommodated in a reformer housing 26 in a cylindrical shape extending in a vertical direction, and the reformer housing 26 has a lower end connected to an upper end of the ammonia gas supply nozzle 24. This enables the reformer housing 26 together with the ammonia gas supply nozzle 24 to be relatively easily attached to the exhaust pipe 12. Further, in this embodiment, the carrier gas source 14 is a carrier gas tank (air tank) (FIG. 2) for storing therein a carrier gas (air) compressed by a compressor (not shown). It is noted that the carrier gas source may be constituted of a compressor for supplying air in the atmosphere, an exhaust gas of the engine, or a mixed gas of them, into the carrier gas heating unit.

In turn, the carrier gas heating unit 16 (FIG. 1) comprises: a coil holding portion 16a, which has at an upper end a stepped flange 16e integrally formed therewith, and which is formed in a columnar shape extending in a vertical direction; an electrothermal coil 16b buried in and along an outer peripheral surface of the coil holding portion 16a such that the electrothermal coil 16b is not exposed on the outer peripheral surface of the coil holding portion 16a; and a carrier gas flow passage-oriented coil 16c helically wound around the outer peripheral surface of the coil holding portion 16a. The coil holding portion 16a is formed of a metal such as SUS316, Inconel™ (of Special Metals Corporation), or the like, having a relatively high thermal conductivity between 15 and 17 W/(m·K). Although not shown, the electrothermal coil 16b is constituted of: a metal sheath (very thin tube made of metal); a heat generator such as a nichrome wire or the like unsnugly inserted through the metal sheath; and a high-purity powder of inorganic insulator, filled in a gap between the metal sheath and the heat generator. Here, although not shown, examples of usable techniques for burying the electrothermal coil 16b in the coil holding portion 16a include a technique to: prepare a first holding portion in a columnar shape having a diameter slightly smaller than that of the coil holding portion 16a; form a concave groove in a helical shape capable of accommodating therein the electrothermal coil 16b, around an outer peripheral surface of the first holding portion; accommodate the electrothermal coil 16b in the helical concave groove; and then fit, onto the first holding portion, a second holding portion having the same outer diameter as that of the coil holding portion 16a. Further, the carrier gas flow passage-oriented coil 16c is formed by helically winding a metal wire material such as SUS316, SUS304, Inconel, or the like having a relatively high thermal conductivity between 15 and 17 W/(m·K), onto an outer peripheral surface of the coil holding portion 16a. The carrier gas flow passage-oriented coil 16c is helically wound with a predetermined pitch D (FIG. 1) between mutually adjacent metal wire material portions, thereby forming a carrier gas flow passage 16d for causing the carrier gas to helically flow along the outer peripheral surface of the coil holding portion 16a. Namely, the space formed by leaving the predetermined pitch D is configured to act as the carrier gas flow passage 16d for allowing the carrier gas to flow therethrough.

The carrier gas heating unit 16 is accommodated in a heating unit-oriented casing 27 having an upper portion formed in a cylindrical shape and a lower portion formed in a funnel shape convergedly tapered downwardly, and the heating unit-oriented casing 27 is inserted in the upper portion of the reformer housing 26. Formed between an outer peripheral surface of the carrier gas flow passage-oriented coil 16c and an inner peripheral surface of the heating unit-oriented casing 27, is a gap T (FIG. 1) within a range of 0.4 to 0.5 mm, when the carrier gas heating unit 16 is accommodated in the heating unit-oriented casing 27. Here, the reason why the gap T is limited in the range of 0.4 to 0.5 mm is that, gaps less than 0.4 mm result in that the heat generated by the electrothermal coil 16b and transmitted through the coil holding portion 16a to the carrier gas flow passage-oriented coil 16c is undesirably transmitted up to the heating unit-oriented casing 27 and then dissipated therefrom, while gaps exceeding 0.5 mm result in that most of the carrier gas flows not in the carrier gas flow passage 16d in the helical shape but through the gap T, thereby failing to heat the carrier gas by the carrier gas heating unit 16. Further, the carrier gas injecting nozzle 17 is formed at the lower end of the heating unit-oriented casing 27, and is configured so that the carrier gas heated by the carrier gas heating unit 16 is injected downwardly from the tip end (lower end) of the carrier gas injecting nozzle 17 itself. It is noted that reference numeral 28 in FIG. 1 and FIG. 2 designates a carrier gas supply pipe connected to upper portions of the reformer housing 26 and heating unit-oriented casing 27. This carrier gas supply pipe 28 has a proximal end connected to the carrier gas tank 14 (FIG. 2), and a distal end connected to the carrier gas flow passage 16d (FIG. 1).

Meanwhile, the first urea solution supply nozzle 21 is inserted into the reformer housing 26 at a substantially middle portion in a vertical direction of its outer peripheral surface, and is extended horizontally in the housing. Specifically, the first urea solution supply nozzle 21 is horizontally inserted into the reformer housing 26, such that the tip end portion of the nozzle is positioned slightly below the tip end of the carrier gas injecting nozzle 17 at the lower end of the heating unit-oriented casing 27. Further, the tip end of the first urea solution supply nozzle 21 is closed, and the tip end portion is formed, at a position thereof opposed to the tip end of the carrier gas injecting nozzle 17, with a urea solution supply hole 21a vertically penetrating through the tip end portion. The first urea solution supply nozzle 21 is configured in this way, so that the urea solution 18 supplied to the urea solution supply hole 21a of the first urea solution supply nozzle 21 is blown off and atomized by the carrier gas injected from the carrier gas injecting nozzle 17, in a manner to raise the temperature of the urea solution.

The catalyst unit 23 in this embodiment comprises: a first catalyst portion 23a downwardly placed at a relatively larger distance from the first urea solution supply nozzle 21, and faced toward the carrier gas injecting nozzle 17; and a second catalyst portion 23b downwardly placed at a relatively smaller distance from the first catalyst portion 23a. The first and second catalyst portions 23a, 23b are configured in the same manner. Specifically, the first and second catalyst portions 23a, 23b are each a monolithic catalyst constituted of a honeycomb carrier made of cordierite coated with titania, zirconia, or zeolite. In case of comprising titania, the first and second catalyst portions 23a, 23b are each configured by coating a slurry containing titania onto a honeycomb carrier. In case of comprising zirconia, the first and second catalyst portions 23a, 23b are each configured by coating a slurry containing zirconia onto a honeycomb carrier. In case of comprising zeolite, the first and second catalyst portions 23a, 23b are each formed by coating a slurry containing a zeolite powder onto a honeycomb carrier. It is noted that the honeycomb carrier made of cordierite may be a metal carrier formed of stainless steel.

The relatively wide space between the first urea solution supply nozzle 21 and the first catalyst portion 23a is so configured that the atomized urea solution 18 is progressively spread as the same is moved downwardly, in a manner to be substantially uniformly dispersed over the whole inlet face (upper face) of the first catalyst portion 23a. Further provided are: a first dispersion plate 31, at an outlet side (lower side) of the first catalyst portion 23a and at an inlet side (upper side) of the second catalyst portion 23b, in a manner to oppose to the outlet face (lower face) of the first catalyst portion 23a; and a second dispersion plate 32, at an outlet side (lower side) of the second catalyst portion 23b and at an inlet side (upper side) of the ammonia gas supply nozzle 24, in a manner to oppose to an outlet face (lower face) of the second catalyst portion 23b. The first and second dispersion plates 31, 32 are with multiple through-holes 31a, 32a, respectively, and configured to receive the urea solution 18 discharged from the first and second catalyst portions 23a, 23b, respectively. The first and second dispersion plates 31, 32 are each formed of SUS316, SUS304, Inconel, or the like having a relatively high thermal conductivity between 15 and 17 W/(m·K).

Meanwhile, inserted in the first catalyst portion 23a is a first glow plug 41 capable of directly heating the first catalyst portion 23a, and inserted in the second catalyst portion 23b is a second glow plug 42 capable of directly heating the second catalyst portion 23b. The first glow plug 41 is inserted into the first catalyst portion 23a at a substantially middle portion thereof in a vertical direction, and is extended horizontally, while the second glow plug 42 is inserted into the second catalyst portion 23b at a substantially middle portion thereof in a vertical direction, and is extended horizontally. The first and second glow plugs 41, 42 are each configured in substantially the same manner as a glow plug to be mounted in a cylinder head of a diesel engine to thereby preheat the interior of a combustion chamber of the engine, and are each provided in a structure in which an electrothermal wire is incorporated in a metal tube. Further, the ammonia gas supply nozzle 24 is mounted to the exhaust pipe 12 of the engine 11. The ammonia gas supply nozzle 24 comprises a nozzle body 24a formed in a cylindrical shape, and a flange portion 24b formed at an upper end of the nozzle body 24a integrally therewith. The nozzle body 24a has a lower surface formed as a slant surface so that the length of the nozzle body 24a is progressively shortened from an exhaust-gas upstream side toward an exhaust-gas downstream side. The flange portion 24b is attached to a flange portion 12a provided at the exhaust pipe 12.

The urea solution reformer 13 is incorporated into an exhaust gas purifier of the diesel engine 11 as shown in FIG. 2. This exhaust gas purifier comprises: a selective catalytic reduction catalyst 51 provided in the exhaust pipe 12 of the engine 11; the urea solution reformer 13 having the ammonia gas supply nozzle 24 engaged into the exhaust pipe 12 at an exhaust-gas upstream side of the selective catalytic reduction catalyst 51; urea solution supply means 53 having a second urea solution supply nozzle 52 engaged into the exhaust pipe 12 at an exhaust-gas upstream side of the selective catalytic reduction catalyst 51 and an exhaust-gas downstream side of the first urea solution supply nozzle 21; a temperature sensor 54 for detecting an exhaust gas temperature related to the selective catalytic reduction catalyst 51; and a controller 56 for controlling the urea solution reformer 13 and the urea solution supply means 53, based on a detection output of the temperature sensor 54.

The selective catalytic reduction catalyst 51 is accommodated in a casing 57 having a diameter larger than the exhaust pipe 12, and is configured to be capable of reducing $NO_x$ in the exhaust gas into $N_2$. The selective catalytic reduction catalyst 51 is a monolithic catalyst constituted of a honeycomb carrier made of cordierite coated with zeolite or zirconia. Examples of the zeolite include copper zeolite, iron zeolite, zinc zeolite, silver zeolite, and the like. In case of comprising copper zeolite, the selective catalytic reduction catalyst 51 is configured by coating a slurry containing a powder of zeolite ion-exchanged with copper, onto a honeycomb carrier. In case of comprising iron zeolite, zinc zeolite, or silver zeolite, the selective catalytic reduction catalyst 51 is configured by coating a slurry containing a powder of zeolite ion-exchanged with iron, zinc, or silver, onto a honeycomb carrier, respectively. Further, in case of comprising zirconia, the selective catalytic reduction catalyst 51 is configured by coating a slurry containing a powder of γ-alumina carrying zirconia thereon or a powder of θ-alumina carrying zirconia thereon, onto a honeycomb carrier.

In turn, the urea solution reformer 13 (FIG. 2) further includes: a first urea solution supply pipe 61 having a tip end connected to the first urea solution supply nozzle 21; a first urea solution tank 62 connected to a proximal end of the first urea solution supply pipe 61, and storing the urea solution 18 in the tank itself; a first pump 63 for pumping the urea solution 18 in the first urea solution tank 62 to the first urea solution supply nozzle 21; a first urea solution supplying amount regulation valve 64 for regulating the supplying amount of the urea solution 18 to be supplied from the first urea solution supply nozzle 21 to the tip end of the carrier gas injecting nozzle 17; and a carrier gas flow rate regulation valve 66 provided in the carrier gas supply pipe 28 for connecting the carrier gas tank 14 to the carrier gas flow passage 16d of the carrier gas heating unit 16. The first pump 63 is provided in the first urea solution supply pipe 61 between the first urea solution supply nozzle 21 and the first urea solution tank 62, while the first urea solution supplying amount regulation valve 64 is provided in the first urea solution supply pipe 61 between the first urea solution supply nozzle 21 and the first pump 63. Further, the first urea solution supplying amount regulation valve 64 comprises: a first urea solution pressure regulation valve 64a provided in the first urea solution supply pipe 61 to thereby regulate a supply pressure of the urea solution 18 to the first urea solution supply nozzle 21; and a first urea solution-oriented opening/closing valve 64b provided at a proximal end of the first urea solution supply nozzle 21 to thereby open and close the proximal end of the first urea solution supply nozzle 21.

The first urea solution pressure regulation valve 64a is a three-way valve having first to third ports 64c to 64e, where the first port 64c is connected to an outlet of the first pump the 63, the second part 64d is connected to the first urea solution-oriented opening/closing valve 64b, and the third port 64e is connected to the first urea solution tank 62 through a first return pipe 65. When the first urea solution pressure regulation valve 64a is activated, the urea solution 18 pumped by the first pump 63 is: caused to flow through the first port 64c into the first urea solution pressure regulation valve 64a; regulated to a predetermined pressure by the first urea solution pressure regulation valve 64a; and then pumped from the second port 64d to the first urea solution-oriented opening/closing valve 64b. Further, when the first urea solution pressure regulation valve 64a is deactivated, the urea solution 18 pumped by the first pump 63 is: caused to flow through the first port 64c into the first urea solution pressure regulation valve 64a; and then returned from the third port 64e through the first return pipe 65 into the first urea solution tank 62. Moreover, the carrier gas flow rate regulation valve 66 is configured to be capable of regulating a flow rate of the carrier gas to be supplied from the carrier gas tank 14 into the carrier gas flow passage 16d of the carrier gas heating unit 16.

The urea solution supply means 53 (FIG. 2) includes: the second urea solution supply nozzle 52 engaged into the exhaust pipe 12 at an exhaust-gas upstream side of the selective catalytic reduction catalyst 51; a second urea solution supply pipe 71 having a tip end connected to the second urea solution supply nozzle 52; a second urea solution tank 72 connected to a proximal end of the second urea solution supply pipe 71, and storing the urea solution 18 in the tank itself; a second pump 73 for pumping the urea solution 18 in the second urea solution tank 72 to the second urea solution supply nozzle 52; a second urea solution supplying amount regulation valve 74 for regulating a supplying amount of the urea solution 18 to be supplied from the second urea solution supply nozzle 52 into the exhaust pipe 12. The urea solution 18 is decomposed into an ammonia gas by an exhaust gas at a relatively high temperature, such that the ammonia gas acts as a reducing agent at the selective catalytic reduction catalyst 51. Further, the second pump 73 is provided in the second urea solution supply pipe 71 between the second urea solution supply nozzle 52 and the second urea solution tank 72, while the second urea solution supplying amount regulation valve 74 is provided in the second urea solution supply pipe 71 between the second urea solution supply nozzle 52 and the second pump 73. Moreover, the second urea solution supplying amount regulation valve 74 comprises: a second urea solution pressure regulation valve 74a provided in the second urea solution supply pipe 71 to thereby regulate a supply pressure of the urea solution 18 into the second urea solution supply nozzle 52; and a second urea solution-oriented opening/closing valve 74b provided at a proximal end of the second urea solution supply nozzle 52 to thereby open and close the proximal end of the second urea solution supply nozzle 52.

The second urea solution pressure regulation valve 74a is a three-way valve having first to third ports 74c to 74e, where the first port 74c is connected to an outlet of the second pump 73, the second port 74d is connected to the second urea solution-oriented opening/closing valve 74b, and the third port 74e is connected to the second urea solution tank 72 through a second return pipe 75. When the second urea solution pressure regulation valve 74a is activated, the urea solution 18 pumped by the second pump 73 is: caused to flow through the first port 74c into the second urea solution pressure regulation valve 74a; regulated to a predetermined pressure by the second urea solution pressure regulation valve 74a; and then pumped from the second port 74d to the second urea solution-oriented opening/closing valve 74b. Further, when the second urea solution pressure regulation valve 74a is deactivated, the urea solution 18 pumped by the second pump 73 is: caused to flow through the first port 74c into the second urea solution pressure regulation valve 74a; and then returned from the third port 74e through the second return pipe 75 into the second urea solution tank 72.

Meanwhile, the diesel engine 11 (FIG. 2) has intake ports connected to an intake pipe 82 through an intake manifold 81, and exhaust ports connected to the exhaust pipe 12 through an exhaust manifold 83. The intake pipe 82 is provided with a compressor housing 84a of a turbocharger 84, and an intercooler 86 for cooling an intake air compressed by the turbocharger 84, and the exhaust pipe 12 is provided with a turbine housing 84b of the turbocharger 84. The compressor housing 84a accommodates therein a compressor rotary vane (not shown) in a rotatable manner, and the turbine housing 84b accommodates therein a turbine rotary vane (not shown) in a rotatable manner. The compressor rotary vane and turbine rotary vane are coupled to each other through a shaft (not shown), and are configured so that the turbine rotary vane, and the compressor rotary vane through the shaft, are rotated by an energy of an exhaust gas to be discharged from the engine 11, and the intake air in the intake pipe 82 is compressed by the rotation of the compressor rotary vane.

In this embodiment, the temperature sensor 54 comprises: a first temperature sensor 54a inserted into the casing 57 at an exhaust-gas inlet side of the selective catalytic reduction catalyst 51, thereby detecting a temperature of an exhaust gas just before flowing into the selective catalytic reduction catalyst 51; and a second temperature sensor 54b inserted into the casing 57 at an exhaust-gas outlet side of the selective catalytic reduction catalyst 51, thereby detecting a temperature of the exhaust gas just after flowing out of the selective catalytic reduction catalyst 51. A rotational speed of the engine 11 is detected by a rotation sensor 87, and a load of the engine 11 is detected by a load sensor 88. Detection outputs of the first temperature sensor 54a, second temperature sensor 54b, rotation sensor 87, and load sensor 88 are connected to control inputs of the controller 56, respectively, and control outputs of the controller 56 are connected to the electrothermal coil 16b, first glow plug 41, second glow plug 42, first pump 63, first urea solution pressure regulation valve 64a, first urea solution-oriented opening/closing valve 64b, carrier gas flow rate regulation valve 66, second pump 73, second urea solution pressure regulation valve 74a, and second urea solution-oriented opening/closing valve 74b, respectively. The controller 56 is provided with a memory 89. This memory 89 previously stores therein: pressures of the first urea solution pressure regulation valve 64a and second urea solution pressure regulation valve 74a, the number of opening/closing operations per unit time of each of the first urea solution-oriented opening/closing valve 64b and second urea solution-oriented opening/closing valve 74b, presence or absence of operations of the first pump 63 and second pump 73, and an opening degree of the carrier gas flow rate regulation valve 66; corresponding to an engine rotational speed, an engine load, and temperatures of exhaust gas at inlet and outlet of the selective catalytic reduction catalyst 51. Further stored as maps in the memory 89 are changes of flow rates of $NO_x$ in an exhaust gas to be discharged from the engine 11, based on changes of an engine rotational speed and an engine load, respectively. It is noted that, although the first temperature sensor is inserted into the casing at the exhaust-gas inlet side of the selective catalytic reduction catalyst and the second temperature sensor is inserted into the casing at the exhaust-gas outlet side of the selective catalytic reduction catalyst in this embodiment, it is possible to use only one of the first and second temperature sensors.

Hereinafter explained is an operation of the exhaust gas purifier having the urea solution reformer 13 configured in the above manner. Just after starting the engine 11, or during an operation of the engine 11 under a light load, the exhaust gas temperature is as low as 100 to 200° C. When the exhaust gas temperature in this temperature range is detected by the first and second temperature sensors 54a, 54b, and the unloaded operation or light load operation of the engine 11 is detected by the rotation sensor 87 and load sensor 88, the controller 56 activates the first pump 63, first urea solution pressure regulation valve 64a, first urea solution-oriented opening/closing valve 64b, and carrier gas flow rate regulation valve 66, based on the respective detection outputs of the first temperature sensor 54a, second temperature sensor 54b, rotation sensor 87, and load sensor 88, in a state that the second pump 73, second urea solution pressure regulation valve 74a, and second urea solution-oriented opening/closing valve 74b are kept deactivated.

When the carrier gas flow rate regulation valve 66 is activated and the electrothermal coil 16b is energized, the carrier gas in the carrier gas tank 14 is supplied into the carrier gas flow passage 16d of the carrier gas heating unit 16. This carrier gas absorbs a heat, which is generated by the electrothermal coil 16b and then transmitted to the coil holding portion 16a, carrier gas flow passage-oriented coil 16c, and the like, while the carrier gas flows through the carrier gas flow passage 16d, and thereafter the carrier gas reaches the carrier gas injecting nozzle 17. The carrier gas flow passage 16d is sufficiently long, thereby enabling to sufficiently heat the carrier gas by the carrier gas heating unit 16. Further, only the carrier gas is caused to flow through the carrier gas flow passage 16d without causing the urea solution 18 to flow therethrough, so that the urea solution 18 is never adhered onto an inner wall of the carrier gas flow passage 16d, and the carrier gas is allowed to smoothly flow through the carrier gas flow passage 16d.

In turn, when the first pump 63, first urea solution pressure regulation valve 64a, and first urea solution-oriented open-ing/closing valve 64b are activated respectively, and the electrothermal coil 16b, first glow plug 41, and second glow plug 42 are energized, the urea solution 18 in the first urea solution tank 62 is supplied to the first urea solution supply nozzle 21 through the first urea solution supply pipe 61. The urea solution 18 thus supplied to the first urea solution supply nozzle 21 is blown off and atomized by the high-temperature carrier gas injected by the carrier gas injecting nozzle 17 toward the urea solution supply hole 21a, in a manner to raise the temperature of the urea solution. Further, the relatively wide space between the first urea solution supply nozzle 21 and the first catalyst portion 23a is so configured that the atomized urea solution 18 is progressively spread as the same is moved downwardly, in a manner to be substantially uniformly dispersed over the whole inlet face (upper face) of the first catalyst portion 23a, and thus most of the substantially uniformly dispersed and atomized urea solution 18 is decomposed to be reformed into the ammonia gas 22 as represented by the following formula (1), by the first catalyst portion 23a:

$$(NH_2)_2CO + H_2O \rightarrow 2NH_3 + CO_2 \tag{1}$$

The formula (1) represents a chemical reaction formula where the urea solution 18 is decomposed into the ammonia gas 22. Here, the temperature of the atomized urea solution 18 just before flowing into the first catalyst portion 23a, is between 90 and 150° C. Further, the first catalyst portion 23a is directly heated by the first glow plug 41 such that the temperature of the first catalyst portion 23a is kept at the temperature (200 to 300° C., for example) capable of reforming the atomized urea solution 18 into the ammonia gas 22, thereby enabling to improve an efficiency for reforming the atomized urea solution 18 into the ammonia gas 22 at the first catalyst portion 23a. Moreover, even when the atomized urea solution 18 has passed through the first catalyst portion 23a without being reformed into the ammonia gas 22 by the first catalyst portion 23a, the urea solution 18 is brought to collide with the first dispersion plate 31. The urea solution 18 collided with the first dispersion plate 31 absorbs a heat from the first dispersion plate 31 and is decomposed into the ammonia gas 22, thereby enabling to increase a produced amount of the ammonia gas 22.

It is noted that, when the atomized urea solution 18 has passed through the first catalyst portion 23a and first dispersion plate 31 without being reformed into the ammonia gas 22, this atomized urea solution 18 is decomposed and reformed into the ammonia gas 22 by the second catalyst portion 23b. Here, the second catalyst portion 23b is directly heated by the second glow plug 42 such that the temperature of the second catalyst portion 23b is kept at the temperature capable of reforming the atomized urea solution 18 into the ammonia gas 22, thereby enabling to improve an efficiency for reforming the atomized urea solution 18 into the ammonia gas 22 at the second catalyst portion 23b. Moreover, when the atomized urea solution 18 has passed through the second catalyst portion 23b without being reformed into the ammonia gas 22 by the second catalyst portion 23b, the urea solution 18 is brought to collide with the second dispersion plate 32. The urea solution 18 collided with the second dispersion plate 32 absorbs a heat from the second dispersion plate 32 and is decomposed into the ammonia gas 22, thereby enabling to increase a produced amount of the ammonia gas 22, and enabling to prevent droplets of the urea solution 18 from flowing into the exhaust pipe 12.

After the urea solution 18 is decomposed and reformed into the ammonia gas 22 by the urea solution reformer 13 in the above manner, this ammonia gas 22 is supplied from the ammonia gas supply nozzle 24 into the exhaust pipe 12.

Thereafter, when the ammonia gas 22 is brought to flow into the selective catalytic reduction catalyst 51 together with the exhaust gas, the ammonia gas 22 acts as a reducing agent for reducing $NO_x$ (NO, $NO_2$) in the exhaust gas such that $NO_x$ in the exhaust gas is quickly reduced into $N_2$ as represented in the following formula (2):

$$NO+NO_2+2NH_3 \rightarrow 2N_2+3H_2O \tag{2}$$

The formula (2) represents a chemical reaction formula where NO and $NO_2$ in the exhaust gas are reacted with the ammonia gas 22 in the selective catalytic reduction catalyst 51, so that NO and $NO_2$ are reduced into $N_2$. As a result, NO can be decreased in amount with a good efficiency, even when the exhaust gas temperature is low.

On the other hand, when the exhaust gas temperature has exceeded 200° C., the controller 56 deactivates the first pump 63, first urea solution pressure regulation valve 64a, first urea solution-oriented opening/closing valve 64b, and carrier gas flow rate regulation valve 66, and deenergizes the electrothermal coil 16b, first glow plug 41, and second glow plug 42, based on detection outputs of the first and second temperature sensors 54a, 54b. In turn, the controller 56 activates the second pump 73, second urea solution pressure regulation valve 74a, and second urea solution-oriented opening/closing valve 74b. This causes the urea solution 18 stored in the second urea solution tank 72 of the urea solution supply means 53, to be injected into the exhaust pipe 12 from the second urea solution supply nozzle 52 through the second urea solution supply pipe 71. The exhaust gas is at a relatively higher temperature exceeding 200° C. at this time, so that the urea solution 18 is quickly decomposed into an ammonia gas within the exhaust pipe 12. Thereafter, when the ammonia gas is brought to flow into the selective catalytic reduction catalyst 51 together with the exhaust gas, the ammonia gas acts as a reducing agent for reducing NO in the exhaust gas such that NO in the exhaust gas is quickly reduced into $N_2$. As a result, NO can be decreased in amount with a good efficiency, even when the exhaust gas temperature is elevated.

Second Embodiment

Figure 3:
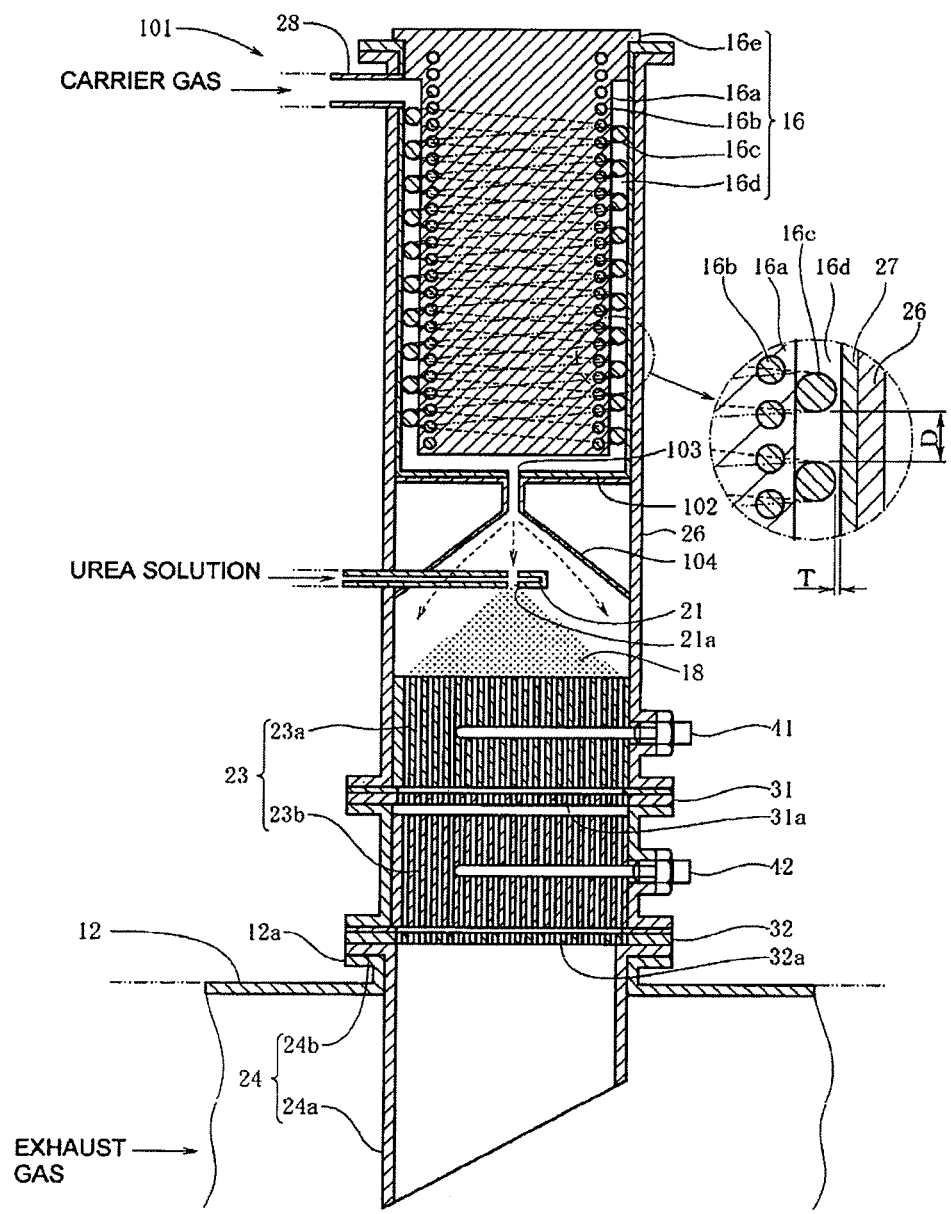
FIG. 3 is a longitudinal constitutional cross-sectional view of a urea solution reformer according to a second embodiment of the present invention.

FIG. 3 shows a second embodiment of the present invention. Like reference numerals as used in FIG. 1 are used to denote identical elements in FIG. 3. In this embodiment, a heating unit casing 102 of a urea solution reformer 101 is formed in a cylindrical shape having a closed lower surface, and a carrier gas injecting nozzle 103 is formed at and through a central portion of the lower surface of the heating unit casing 102. Provided at the lower surface of the heating unit casing 102 is a guide member 104 for guiding a flow of high-temperature carrier gas injected from the carrier gas injecting nozzle 103 in a manner to bring the flow into an endwise widened conical shape. Except for the above, this embodiment is configured in the same manner as the first embodiment.

In this exhaust gas purifier having the urea solution reformer 101 configured in the above manner, the flow of high-temperature carrier gas injected from the carrier gas injecting nozzle 103 is brought into the endwise widened conical shape progressively widened downwardly as indicated by broken-line arrows in FIG. 3, so that the urea solution 18 having reached the first urea solution supply nozzle 21 is atomized and dispersed more uniformly over the inlet face (upper face) of the first catalyst portion 23a than the first embodiment, resulting in a more improved efficiency of decomposition from the atomized and more uniformly dispersed urea solution 18 into an ammonia gas at the first catalyst portion 23a than that in the first embodiment. Operations except for the above are substantially the same as those in the first embodiment, and the repeated explanation thereof shall be omitted.

Third Embodiment

Figure 4:
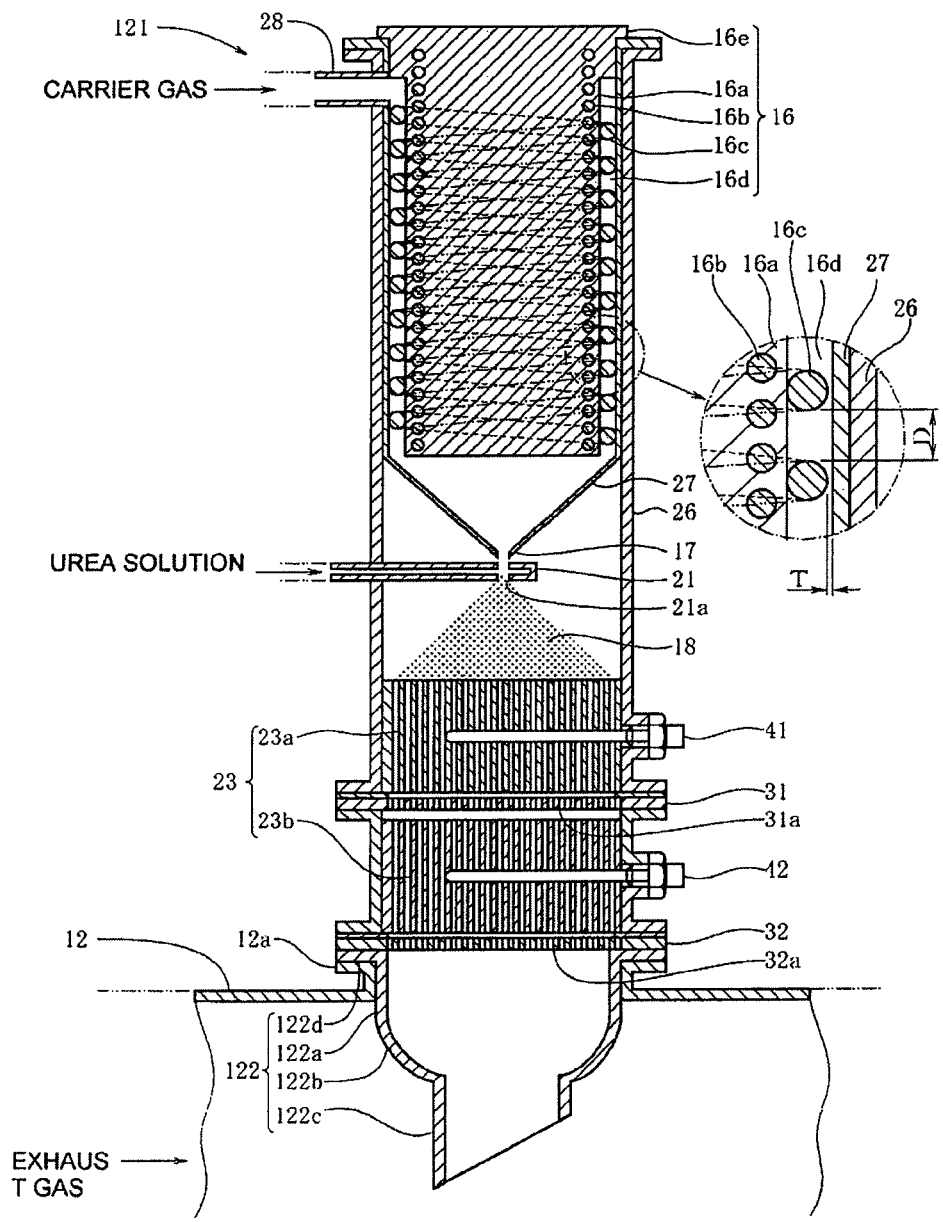
FIG. 4 is a longitudinal constitutional cross-sectional view of a urea solution reformer according to a third embodiment of the present invention.

FIG. 4 shows a third embodiment of the present invention. Like reference numerals as used in FIG. 1 are used to denote identical elements in FIG. 4. In this embodiment, an ammonia gas supply nozzle 122 attached to the exhaust pipe 12 comprises: a large-diameter cylindrical portion 122a in a large-diameter cylindrical shape inserted into the exhaust pipe 12; a constricted portion 122b formed integrally with the large-diameter cylindrical portion 122a at a lower end of the large-diameter cylindrical portion 122a and made to be downwardly smaller in diameter; a small-diameter cylindrical portion 122c in a small-diameter cylindrical shape formed integrally with the constricted portion 122b at a lower end of the constricted portion 122b; and a flange portion 122d formed integrally with the large-diameter cylindrical portion 122a at a lower end of the large-diameter cylindrical portion 122a. The small-diameter cylindrical portion 122c has a lower surface formed as a slant surface so that the length of the small-diameter cylindrical portion 122c is progressively shortened from an exhaust-gas upstream side toward an exhaust-gas downstream side. The flange portion 122d is attached to the flange portion 12a provided at the exhaust pipe 12. Except for the above, this embodiment is configured in the same manner as the first embodiment.

In this exhaust gas purifier having the urea solution reformer 121 configured in the above manner, the flow velocity of the ammonia gas to be supplied from the large-diameter cylindrical portion 122a of the ammonia gas supply nozzle 122, through the constricted portion 122b, and then from the small-diameter cylindrical portion 122c into the exhaust pipe 12, is increased to quickly mix the ammonia gas with an exhaust gas. Operations except for the above are substantially the same as those in the first embodiment, and the repeated explanation thereof shall be omitted.

Fourth Embodiment

Figure 5:
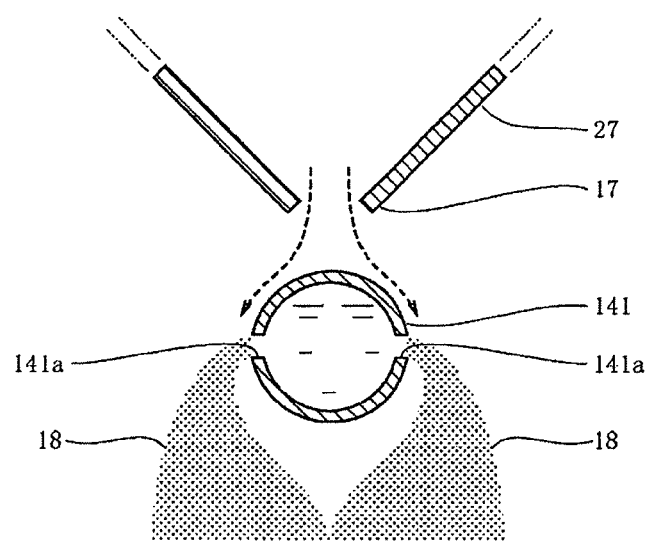
FIG. 5 is a constitutional cross-sectional view of an essential part according to a fourth embodiment of the present invention showing a state that urea solution supply holes of a first urea solution supply nozzle are formed therethrough in a horizontal direction.

FIG. 5 shows a fourth embodiment of the present invention. Like reference numerals as used in FIG. 1 are used to denote identical elements in FIG. 5. In this embodiment, a tip end of a first urea solution supply nozzle 141 is with two urea solution supply holes 141a, 141a oriented in directions defining desired angles relative to a vertical direction, respectively, at a position of the tip end opposed to a tip end of the carrier gas injecting nozzle 17. Specifically, the tip end of the first urea solution supply nozzle 141 is with two urea solution supply holes 141a, 141a extending through a hole axis of the nozzle 141, respectively, in a cross section of the first urea solution supply nozzle 141 opposed to the tip end of the carrier gas injecting nozzle 17. In the thus configured urea solution reformer, the high-temperature carrier gas injected from the carrier gas injecting nozzle 17 is caused to flow along an outer peripheral surface of the first urea solution supply nozzle 141 so that the urea solution 18 supplied into the first urea solution supply nozzle 141 is sucked out of the two urea solution supply holes 141a, 141a and atomized. At this time, the amount of the urea solution 18 to be sucked out of the two urea solution supply holes 141a, 141a is made to be larger than an amount of urea solution to be blown off the urea solution supply hole at the lower side in the first embodiment. Operations except for the above are substantially the same as those of the urea solution reformer of the first embodiment, and the repeated explanation thereof shall be omitted.

Fifth Embodiment

Figure 6:
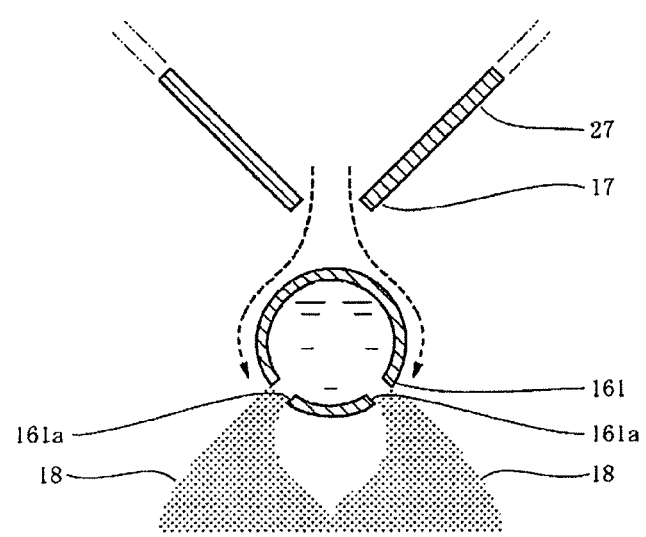
FIG. 6 is a constitutional cross-sectional view of an essential part according to a fifth embodiment of the present invention showing a state that urea solution supply holes of a first urea solution supply nozzle are formed therethrough in obliquely downward directions, respectively.

FIG. 6 shows a fifth embodiment of the present invention. Like reference numerals as used in FIG. 1 are used to denote identical elements in FIG. 6. In this embodiment, a tip end of a first urea solution supply nozzle 161 is with two urea solution supply holes 161a, 161a oriented in directions defining desired angles relative to a vertical direction, respectively, at a position of the tip end opposed to a tip end of the carrier gas injecting nozzle 17. Specifically, the tip end of the first urea solution supply nozzle 161 is with two urea solution supply holes 161a, 161a extending in obliquely downward directions defining angles of about 45° relative to a vertical line extending through a hole axis of the nozzle 161, respectively, in a cross section of the first urea solution supply nozzle 161 opposed to the tip end of the carrier gas injecting nozzle 17. In the thus configured urea solution reformer, the high-temperature carrier gas injected from the carrier gas injecting nozzle 17 is caused to flow along an outer peripheral surface of the first urea solution supply nozzle 161 so that the urea solution 18 supplied into the first urea solution supply nozzle 161 is sucked out of the two urea solution supply holes 161a, 161a and atomized. At this time, the amount of the urea solution 18 to be sucked out of the two urea solution supply holes 161a, 161a is made to be larger than an amount of urea solution to be blown off the urea solution supply hole at the lower side in the first embodiment. Operations except for the above are substantially the same as those of the urea solution reformer of the first embodiment, and the repeated explanation thereof shall be omitted.

Sixth Embodiment

Figure 7:
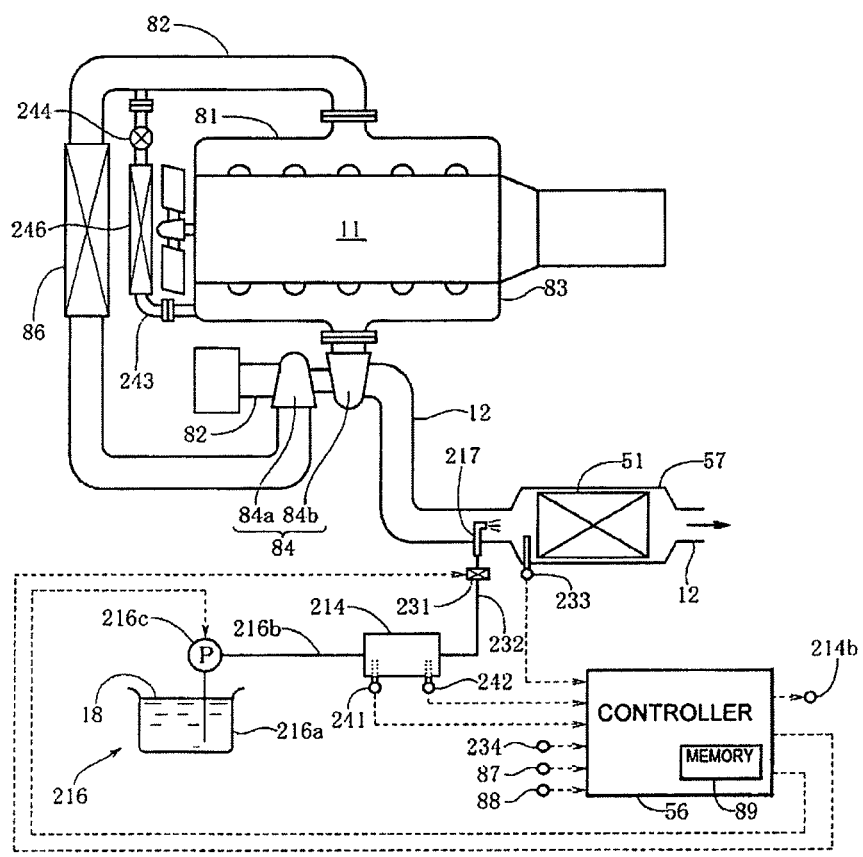
FIG. 7 is a constitutional view showing an exhaust gas purifier according to a sixth embodiment of the present invention.
Figure 8:
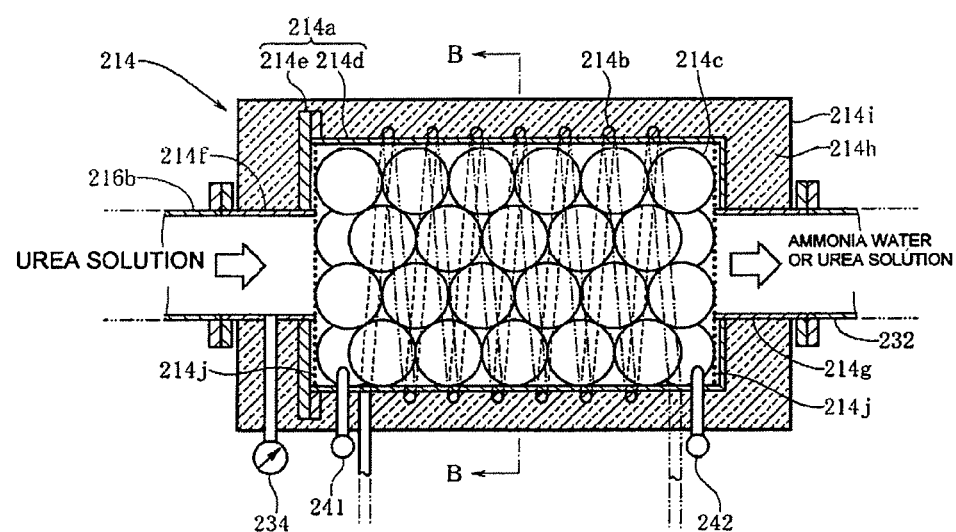
FIG. 8 is a cross-sectional view taken along a line A-A through a urea solution reformer of the exhaust gas purifier shown in FIG. 9.
Figure 9:
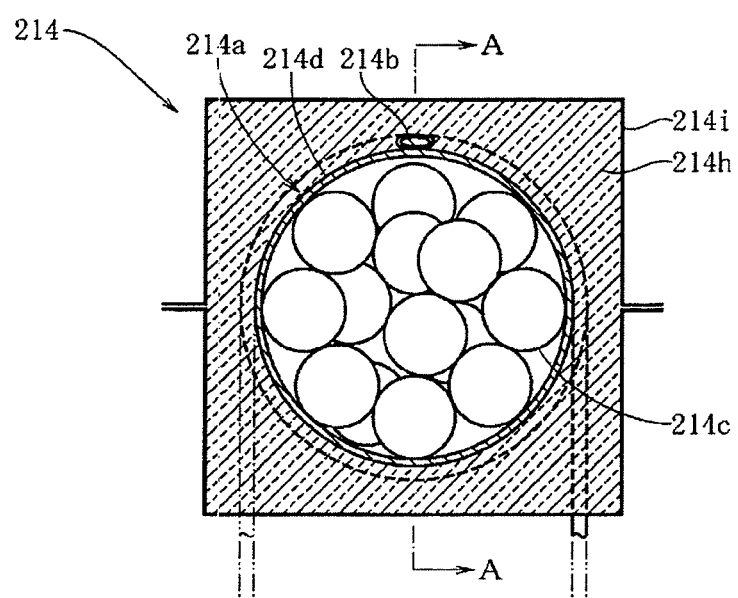
FIG. 9 is a cross-sectional view of the urea solution reformer taken along a line B-B in FIG. 8.

FIG. 7 to FIG. 10 show a sixth embodiment of the present invention. Like reference numerals as used in FIG. 2 are used to denote identical elements in FIG. 7. As shown in FIG. 8 and FIG. 9, in this embodiment, a urea solution reformer 214 for reforming the urea solution 18 into an ammonia water comprises: a reformation casing 214a in a cylindrical shape; a heater 214b helically wound around an outer peripheral surface of the reformation casing 214a; and multiple inorganic porous bodies 214c filled in the reformation casing 214a. The reformation casing 214a comprises: a casing body 214d in a cylindrical shape opened at one end and closed at the other end; a flange 241e detachably attached to the open end of the casing body 214d to thereby openably close the open end of the casing body 214d. Connected to a center of the flange 241e is a supplying short pipe 214f for supplying the urea solution 18 into the reformation casing 214a, and connected to a center of the closed end of the casing body 214d is a discharging short pipe 214g for discharging an ammonia water or urea solution from the interior of the reformation casing 214a. The reformation casing 214a is formed of a metal such as SUS316, SUS304, Inconel™ (of Hungtington Alloys Canada Ltd.), or the like having a relatively high thermal conductivity between 15 and 17 W/(m·K). Further, it is preferable to adopt, as the heater 214b, a so-called sheath heater wherein a heat generator such as a nichrome wire or the like is unsnugly inserted through a metal sheath (very thin tube made of metal), and a high-purity powder of inorganic insulator is filled in a gap between the metal sheath and the heat generator.

It is preferable to adopt, as the inorganic porous bodies 214c, porous zeolite particles, Molecular Sieve (product name of synthetic zeolite developed by Union Carbide Corporation) particles, or the like, having particle diameters of 0.2 to 10 mm, respectively. These inorganic porous bodies 214c cooperatively exhibit a function as a thermal medium for transmitting a heat of the heater 214b into the interior of the reformation casing 214a, and a function as an adsorbent for adsorbing the urea solution 18 in a soaking manner. It is noted that the inorganic porous bodies 214c are capable of carrying thereon catalysts such as titania, zirconia, or the like. Making the inorganic porous bodies 214c to carry such catalysts thereon, respectively, enables to promote hydrolysis of the urea solution 18. Although the inorganic porous bodies 214c are spherical in shape in this embodiment, they may be in ellipsoidal, columnar, disk shapes, or the like.

The urea solution reformer 214 is covered with a thermal insulation casing 214i filled with a heat insulation material 214h. This enables to restrict dissipation of heat generated by the heater 214b. Further, reference numerals 214j, 214j in FIG. 8 designate net members, respectively, for preventing the inorganic porous bodies 214c from rolling out of the reformation casing 214a into the supplying short pipe 214f or discharging short pipe 214g. The urea solution reformer 214 is so configured that, when the urea solution 18 is supplied to the urea solution reformer 214 in a state that the heater 214b is turned on: the whole of the urea solution 18 is reformed into an ammonia water by the urea solution reformer 214, and this ammonia water is supplied to an injecting nozzle 217; or part of the urea solution 18 is reformed into an ammonia water by the urea solution reformer 214, and the remainder of the urea solution 18 is not reformed and is passed through the urea solution reformer 214, in a manner to supply a mixed liquid of ammonia water and urea solution to the injecting nozzle 217. In turn, the urea solution reformer 214 is so configured that, when the urea solution 18 is supplied to the urea solution reformer 214 in a state that the heater 214b is turned off, the urea solution 18 is not reformed at all by the urea solution reformer 214, and the urea solution 18 is passed through the urea solution reformer 214 and supplied to the injecting nozzle 217.

Returning to FIG. 7, shown therein is urea solution supply means 216 comprising: a urea solution tank 216a storing therein the urea solution 18; a first supply pipe 216b for connecting the urea solution tank 216a to the supplying short pipe 214f of the urea solution reformer 214; and a pump 216c provided in the first supply pipe 216b to thereby pump the urea solution 18 in the urea solution tank 216a to the urea solution reformer 214. The pump 216c is driven by a pump driving motor (not shown). The pump driving motor is so configured that the speed thereof is changed continuously or stepwise, thereby enabling to regulate the pressure of the urea solution 18 to be discharged from the pump 216c. Further, the discharging short pipe 214g of the urea solution reformer 214 is connected to an injecting nozzle 217 through a second supply pipe 232, and this second supply pipe 232 is provided with a flow rate regulation valve 231 for opening/closing the second supply pipe 232 to thereby regulate the flow rate of the ammonia water or urea solution to be injected from the injecting nozzle 217. This flow rate regulation valve 231 is configured to be capable of regulating the flow rate of the ammonia water or urea solution to be injected from the injecting nozzle 217, by controlling the number of opening/closing operations per unit time of this valve, an opening time length, and a closing time length.

Meanwhile, provided at an exhaust-gas inlet side of the selective catalytic reduction catalyst 51 in the catalyst casing 57, is a catalyst temperature sensor 233 for detecting an exhaust gas temperature related to the selective catalytic reduction catalyst 51. Provided at the supplying short pipe 214f of the urea solution reformer 214, is a pressure sensor 234 for detecting an inlet pressure of the urea solution reformer 214. Further, provided at an inlet side of the reformation casing 214a of the urea solution reformer 214 is a first urea solution temperature sensor 241 for detecting the temperature of the urea solution 18 at the inlet side of the reformation casing 214a; and provided at an outlet side of the reformation casing 214a of the urea solution reformer 214 is a second urea solution temperature sensor 242 for detecting the temperature of the ammonia water or urea solution at the outlet side of the reformation casing 214a. In turn, the engine 11 is provided with the rotation sensor 87 for detecting the rotational speed of the engine 11, and with the load sensor 88 for detecting the load of the engine 11. The detection outputs of the catalyst temperature sensor 233, pressure sensor 234, first urea solution temperature sensor 241, second urea solution temperature sensor 242, rotation sensor 87, and load sensor 88 are connected to control inputs of the controller 56, and the control outputs of the controller 56 are connected to the heater 214b, the pump driving motor and the flow rate regulation valve 231, respectively.

Figure 10:
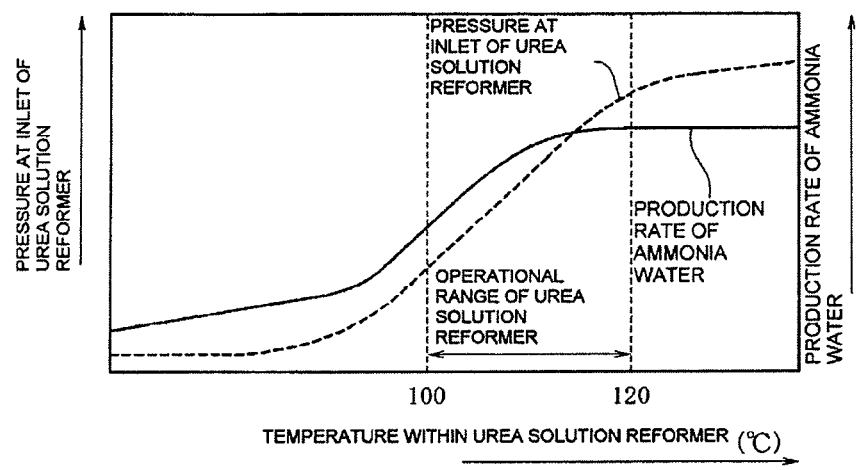
FIG. 10 is a graph of a change of an ammonia water production rate in the urea solution reformer, relative to a temperature change of the urea solution reformer and relative to a change in an inlet pressure of the urea solution reformer.

The controller 56 is provided with the memory 89. This memory 89 previously stores therein: a speed of the pump driving motor, the number of opening/closing operations per unit time of the flow rate regulation valve 231, an opening time length, and a closing time length; corresponding to an engine rotational speed, an engine load, and temperatures of exhaust gas at an inlet side of the selective catalytic reduction catalyst 51. Further stored as maps in the memory 89 are changes of flow rates of $NO_x$ in an exhaust gas, corresponding to changes of an engine rotational speed and an engine load, respectively. Moreover, stored as maps in the memory 89 are changes of ammonia production ratios, corresponding to an inlet pressure of the urea solution reformer 214, a temperature within the urea solution reformer 214, a flow rate of an ammonia water or urea solution to be discharged from the urea solution reformer 214, as shown in FIG. 10, for example. Although the operational range of the urea solution reformer 214 upon reforming therein the urea solution 18 into an ammonia water is varied depending on a shape of the urea solution reformer 214, a flow rate of the ammonia water, and the like, it is preferable to control, by the heater 214b, the temperature (an average temperature of detection outputs of the first and second urea solution temperature sensors 241, 242) within the urea solution reformer 214 to a range between 100° C. inclusive and 120° C. exclusive. Since the inlet pressure of the urea solution reformer 214 is relatively high at this time, this urea solution reformer 214 is made in such a manner to have a pressure resistance. Further, the temperature difference between detection outputs of the first and second urea solution temperature sensors 241, 242 allows to detect an efficiency of the heater 214b for heating the urea solution 18.

It is noted that reference numeral 243 in FIG. 7 designates an EGR tube for communicatingly connecting the exhaust manifold 83 and intake pipe 82 with each other, while bypassing the engine 11. This EGR tube 243 is branched from a branch pipe section of the exhaust manifold 83, and is merged into the intake pipe 82 at an intake-air downstream side of the intercooler 86. Reference numeral 244 in FIG. 7 designates an EGR valve provided in the EGR tube 243 and configured to regulate a flow rate of an exhaust gas (EGR gas) to be flowed back from the EGR tube 243 into the intake pipe 82. Further, reference numeral 246 in FIG. 7 designates an EGR cooler for cooling an exhaust gas (EGR gas) flowing through the EGR tube 243.

Hereinafter explained is an operation of the exhaust gas purifier configured in the above manner. Just after starting the engine 11, or during an operation of the engine 11 under a light load, the exhaust gas temperature is as low as 100 to 180° C. When the exhaust gas temperature in this temperature range is detected by the catalyst temperature sensor 233, and the unloaded operation or light load operation of the engine 11 is detected by the rotation sensor 87 and load sensor 88, the controller 56 turns on the heater 214b and gradually increases a speed of the pump driving motor, based on the respective detection outputs of the catalyst temperature sensor 233, rotation sensor 87, and load sensor 88. Further, when the pressure sensor 234 detects that the inlet pressure of the urea solution reformer 214 has been brought to a predetermined pressure, the pump driving motor is kept to be driven at the speed at that time. Moreover, when the first and second urea solution temperature sensors 241, 242 detect, in this state, that the urea solution 18 in the urea solution reformer 214 has been brought to a predetermined temperature (average temperature of 110° C., for example), the controller 56 opens and closes the flow rate regulation valve 231, with the predetermined number of opening/closing operations per unit time, a predetermined opening time length, and a predetermined closing time length.

In this way, the urea solution 18 supplied to the urea solution reformer 214 is reformed into an ammonia water in its entirety without being evaporated, and thereafter the ammonia water is injected from the injecting nozzle 217 into the exhaust pipe 12. At this time, the urea solution 18 is reformed into an ammonia water at the urea solution reformer 214, with reactions as represented by the following formula (3) and formula (4):

$$NH_2—CO—NH_2+H_2O \rightarrow NH_3+HNCO+H_2O \quad (3)$$

$$HNCO+H_2O \rightarrow NH_3+CO_2 \quad (4)$$

The formula (3) is a thermal decomposition formula of the urea solution 18, without contribution of water to this reaction. Further, the formula (4) is a hydrolysis formula from isocyanic acid (HNCO) into ammonia ($NH_3$). The ammonia ($NH_3$) produced by this hydrolysis is easily dissolvable in water to thereby establish an ammonia water (at a saturated water vapor pressure or higher), and carbon dioxide ($CO_2$) is not easily dissolvable in water, thereby leading to such a state that part of carbon dioxide dissolves in the ammonia water by heating and most of carbon dioxide is dispersed in the ammonia water.

In this way, the urea solution 18 is reformed, without being evaporated, into the ammonia water by the urea solution reformer 214, thereby enabling to prevent urea from being crystallized due to evaporation of water only. This resultingly enables to prevent deposition of otherwise crystallized urea in the urea solution reformer 214. Further, although the ammonia water reformed by the urea solution reformer 214 contains carbon dioxide in a gaseous state, most of the ammonia water is liquid and is thus not so changed in volume even by pressure change, so that the supplying amount of ammonia water into the exhaust pipe 12 can be easily controlled to an optimum flow rate. The ammonia water injected from the injecting nozzle 217 into the exhaust pipe 12 is quickly vaporized and turned into an ammonia gas even when the exhaust gas temperature is relatively low, and this ammonia gas flows, together with the exhaust gas, into the selective catalytic reduction catalyst 51. The ammonia gas flowed into the selective catalytic reduction catalyst 51 together with the exhaust gas acts as a reducing agent for reducing $NO_x$ (NO, $NO_2$) in the exhaust gas. Namely, $NO_x$ in the exhaust gas is quickly reduced into $N_2$ by the selective catalytic reduction catalyst 51, as represented by the following formula (5):

$$NO+NO_2+2NH_3 \rightarrow 2N_2+3H_2O \qquad (5)$$

The formula (5) shows a chemical reaction formula representing that NO and $NO_2$ in the exhaust gas are reacted with the ammonia gas in the selective catalytic reduction catalyst 51 so that NO and $NO_2$ are reduced into $N_2$. As a result, $NO_x$ in the exhaust gas can be decreased in amount with a good efficiency, even when the exhaust gas temperature is relatively low.

Meanwhile, when the exhaust gas temperature has exceeded 180° C., the controller 56 turns off the heater 214b, based on the detection output of the catalyst temperature sensor 233. However, the controller 56 drives the pump driving motor at a predetermined speed, and opens and closes the flow rate regulation valve 231, with the predetermined number of opening/closing operations (per unit time), a predetermined opening time length, and a predetermined closing time length. This causes the urea solution 18 to be passed through the urea solution reformer 214 without being reformed into an ammonia water by the urea solution reformer 214, and is then injected from the injecting nozzle 217 into the exhaust pipe 12. The thus injected urea solution is reformed into an ammonia gas by an exhaust gas at a relatively high temperature, so that this ammonia gas acts as a reducing agent for reducing $NO_x$ in the exhaust gas into $N_2$ on the selective catalytic reduction catalyst 51, thereby enabling to decrease an amount of $NO_x$ in the exhaust gas with a good efficiency.

Seventh Embodiment

Figure 11:
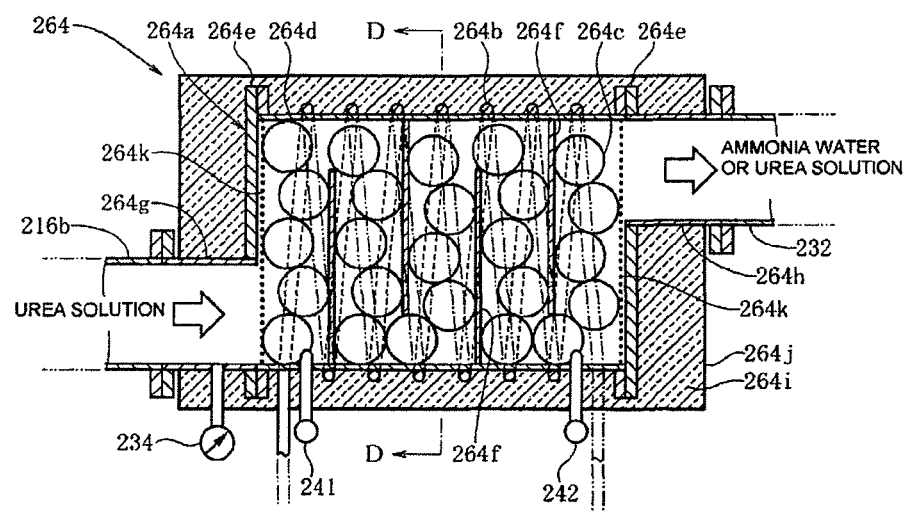
FIG. 11 is a cross-sectional view taken along a line C-C through a urea solution reformer according to a seventh embodiment of the present invention shown in FIG. 12.
Figure 12:
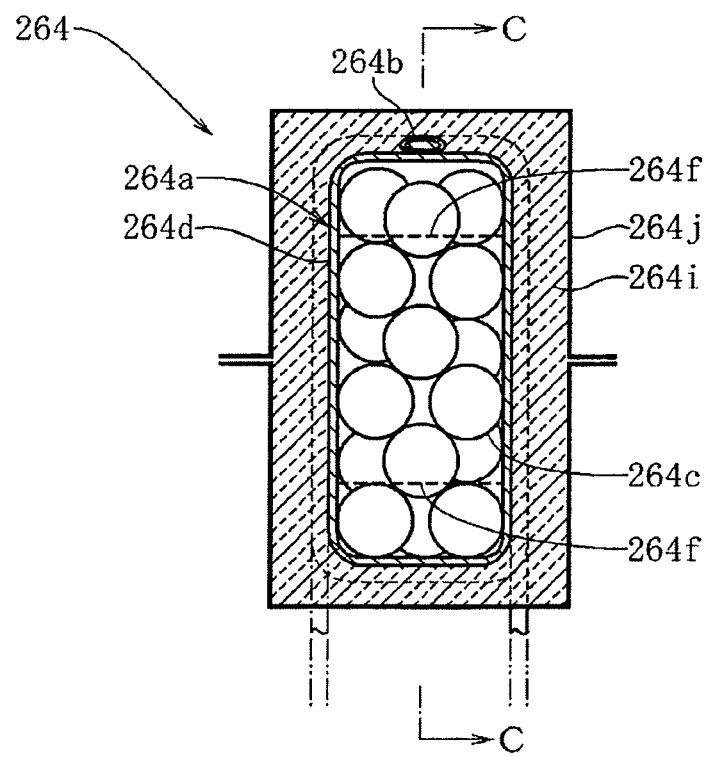
FIG. 12 is a cross-sectional view of the urea solution reformer taken along a line D-D in FIG. 11.

FIG. 11 and FIG. 12 show a seventh embodiment of the present invention. Like reference numerals as used in FIG. 8 and FIG. 9 are used to denote identical elements in FIG. 11 and FIG. 12. In this embodiment, a urea solution reformer 264 comprises: a reformation casing 264a in a tubular shape; a heater 264b helically wound around an outer peripheral surface of the reformation casing 264a; and multiple inorganic porous bodies 264c filled in the reformation casing 264a. The reformation casing 264a comprises: a casing body 264d in a shape of rectangular tube having both open ends; a pair of flanges 264e, 264e in shapes of rectangular plates detachably attached to both end surfaces of the casing body 264d in a manner to openably close the both end surfaces of the casing body 264d, respectively; and multiple partition plates 264f provided within the casing body 264d at predetermined intervals in a longitudinal direction of the casing body 264d. The interior of the casing body 264d is divided by the partition plates 264f into multiple spaces communicated with one another, and the multiple inorganic porous bodies 264c are filled in these spaces. The reformation casing 264a is made of the same material as that of the reformation casing in the sixth embodiment, and the inorganic porous bodies 264c are formed of the same material and in the same shapes as those of the inorganic porous bodies in the sixth embodiment.

Meanwhile, connected to a lower portion of the flange 264e closing the inlet-side end surface of the casing body 264d is a supplying short pipe 264g for supplying the urea solution into the reformation casing 264a, and connected to an upper portion of the flange 264e closing the outlet-side end surface of the casing body 264d is a discharging short pipe 264h for discharging an ammonia water or urea solution from the interior of the reformation casing 264a. The urea solution reformer 264 is covered with a heat insulation casing 264j filled with a heat insulation material 264i. This enables to restrict dissipation of heat generated by the heater 264b.

Further, reference numerals 264k, 264k in FIG. 11 designate net members, respectively, for preventing the inorganic porous bodies 264c from rolling out of the reformation casing 264a into the supplying short pipe 264g or discharging short pipe 264h. Except for the above, this embodiment is configured in the same manner as the sixth embodiment.

In the exhaust gas purifier configured in the above manner, the urea solution flowed into the reformation casing 264a is caused to pass therethrough while meandering through the multiple spaces, in a manner to increase a ratio of contact of the urea solution with the inorganic porous bodies 264c, thereby enabling to reform the urea solution into an ammonia water with a better efficiency. Operations except for the above are substantially the same as those in the sixth embodiment, and the repeated explanation thereof shall be omitted.

Eighth Embodiment

FIG. 13 to FIG. 16 show an eighth embodiment of the present invention. Like reference numerals as used in FIG. 8 and FIG. 9 are used to denote identical elements in FIG. 13 to FIG. 15. In this embodiment, a urea solution reformer 284 comprises: a heater 284a in a rod shape; a reducing agent flow pipe 284b helically wound around an outer peripheral surface of the heater 284a, and configured to allow a urea solution to flow through the pipe itself; and an adsorbent layer 284c (FIG. 16) coated on an inner peripheral surface of the reducing agent flow pipe 284b, to adsorb the urea solution. It is preferable to adopt, as the heater 284a, such a heating component obtained by helically burying a so-called sheath heater in the columnar body 284g, wherein a heat generator 284d such as a nichrome wire or the like is unsnugly inserted through a metal sheath (very thin tube made of metal), and a high-purity powder of inorganic insulator is filled in a gap between the metal sheath and the heat generator 284d. The reducing agent flow pipe 284b is formed of a metal such as SUS316, SUS304, Inconel™ (of Hungtington Alloys Canada Ltd.), or the like having a relatively high thermal conductivity between 15 and 17 W/(m·K). This allows a heat of the heater 284a to be transmitted to an inner surface of the reducing agent flow pipe 284b with a good efficiency.

Figure 16:
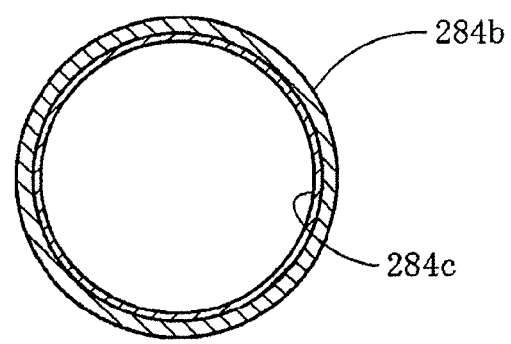
FIG. 16 is a cross-sectional view of the urea solution reformer taken along a line G-G in FIG. 15.

Meanwhile, the adsorbent layer 284c is to be preferably formed to have a thickness of 0.01 to 0.1 mm, by using a porous zeolite, Molecular Sieve (product name of synthetic zeolite developed by Union Carbide Corporation) or the like (FIG. 16). Further, the adsorbent layer 284c exhibits a function as a thermal medium for transmitting a heat of the heater 284a once transmitted to the reducing agent flow pipe 284b into the interior of the reducing agent flow pipe 284b itself, and a function as an adsorbent for adsorbing the urea solution in a soaking manner. It is noted that the adsorbent layer 284c is capable of carrying thereon a catalyst such as titania, zirconia, or the like. Making the adsorbent layer 284c to carry such a catalyst thereon, enables to promote hydrolysis of the urea solution. The urea solution reformer 284 is covered with a heat insulation casing 284f (FIG. 13 and FIG. 14) filled with a heat insulation material 284e. This enables to restrict dissipation of heat generated by the heater 284a.

Figure 13:
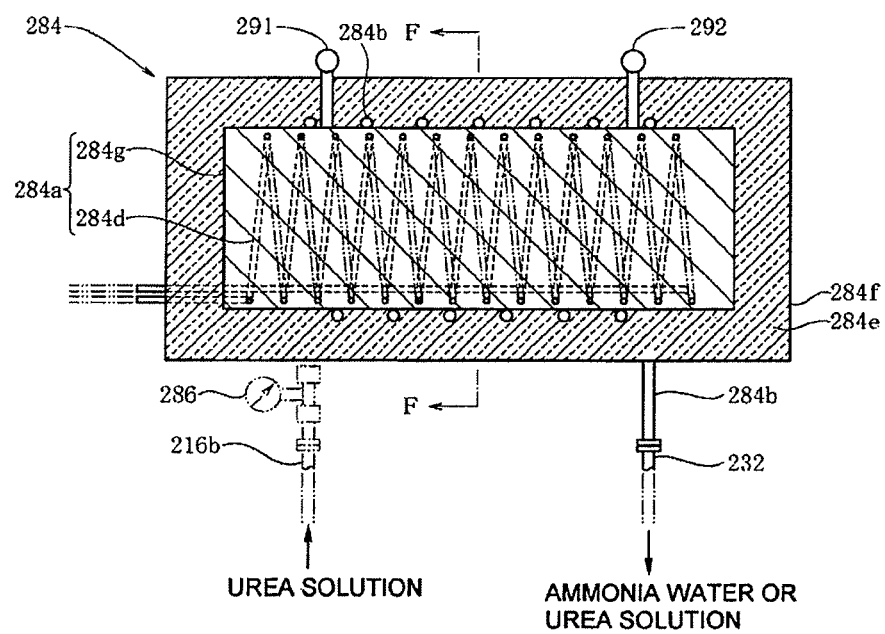
FIG. 13 is a cross-sectional view taken along a line E-E through a urea solution reformer according to an eighth embodiment of the present invention shown in FIG. 14.
Figure 14:
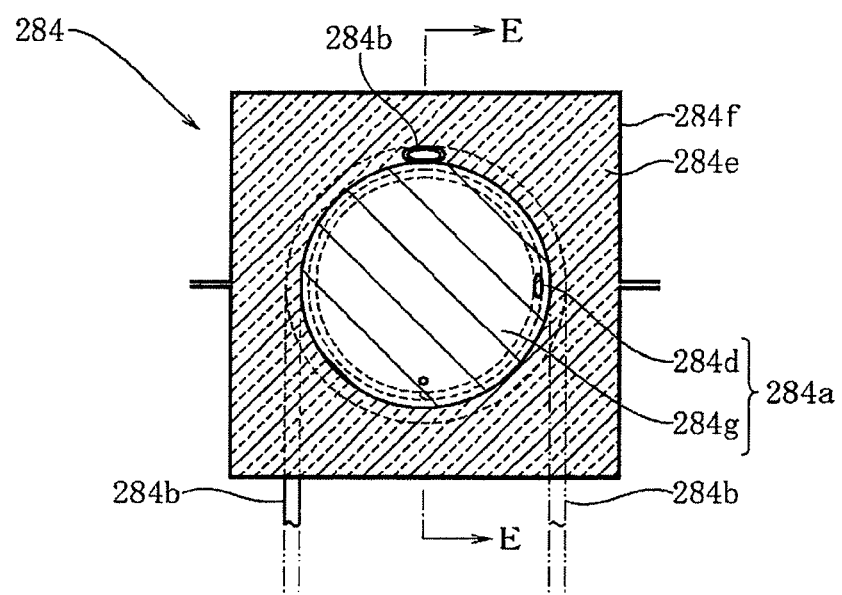
FIG. 14 is a cross-sectional view of the urea solution reformer taken along a line F-F in FIG. 13.
Figure 15:
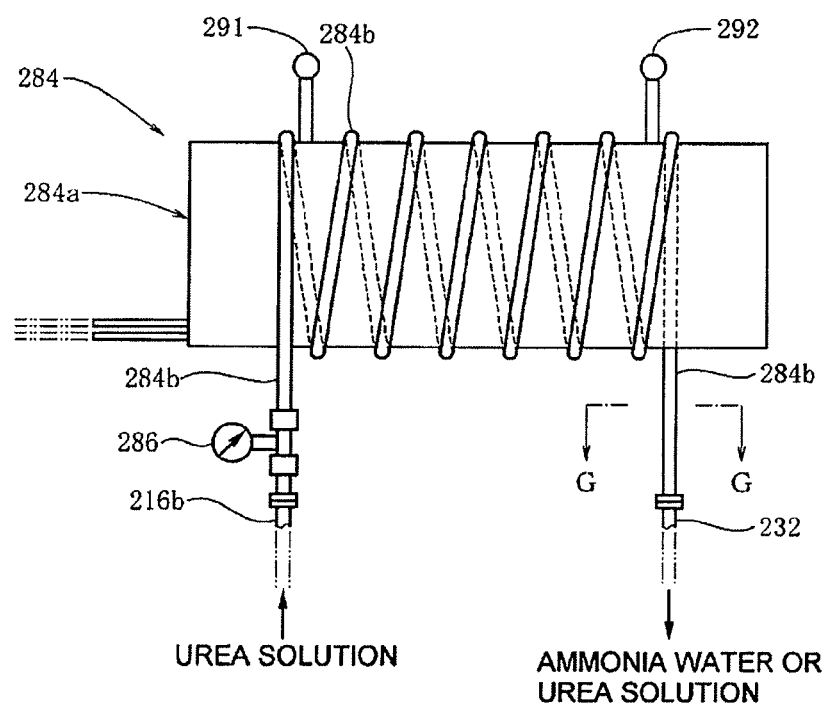
FIG. 15 is a side view of the urea solution reformer in a state that a heat insulation casing and a heat insulation material are detached from the urea solution reformer.

Meanwhile, further, a pressure sensor 286 for detecting an inlet pressure of the urea solution reformer 284 is provided at the reducing agent flow pipe 284b just before wound around the heater 284a, in a manner to detect a pressure of the urea solution in the reducing agent flow pipe 284b (FIG. 13 and FIG. 15). Further, a first heater temperature sensor 291 detects a surface temperature of the heater 284a near a starting portion of winding of the reducing agent flow pipe 284b around the heater 284a; and a second heater temperature sensor 292 detects a surface temperature of the heater 284a near an ending portion of winding of the reducing agent flow pipe 284b around the heater 284a. Namely, in a state that the heater 284a is turned on, the temperature of that urea solution in the reducing agent flow pipe 284b which urea solution is started to be heated by the heater 284a, is indirectly detected by the first heater temperature sensor 291, and the temperature of that ammonia water in the reducing agent flow pipe 284b the heating of which ammonia water by the heater 284a has been terminated, is indirectly detected by the second heater temperature sensor 292. Further, one end (supply-side end portion of the urea solution to the urea solution reformer 284) of the reducing agent flow pipe 284b is connected to the first supply pipe 216b, and the other end (discharge-side end portion of the ammonia water or urea solution from the urea solution reformer 284) of the reducing agent flow pipe 284b is connected to the second supply pipe 232. Except for the above, this embodiment is configured in the same manner as the sixth embodiment.

In the exhaust gas purifier configured in the above manner, when the urea solution is flowing through the reducing agent flow pipe 284b helically wound around the heater 284a, the reducing agent flow pipe 284b transmits the heat of the heater 284a to the inner surface of the reducing agent flow pipe 284b itself, and the adsorbent layer 284c adsorbs the urea solution in a soaking manner, thereby enabling to reform the urea solution into an ammonia water in the helical reducing agent flow pipe 284b with a good efficiency. Further, it is enough to helically wind the reducing agent flow pipe 284b around the outer peripheral surface of the rod-like heater 284a, thereby allowing to relatively easily fabricate the reducing agent flow pipe 284b with a relatively lower precision without increasing the number of fabrication steps. Operations except for the above are substantially the same as those in the sixth embodiment, and the repeated explanation thereof shall be omitted.

It is noted that, although the exhaust gas purifiers of the present invention have been applied to diesel engines in the first to eighth embodiments, respectively, the exhaust gas purifiers of the present invention may each be applied to a gasoline engine. Further, although the exhaust gas purifiers of the present invention each have been applied to the diesel engine having a turbocharger, the exhaust gas purifiers of the present invention may each be applied to a naturally-aspirated diesel engine, or naturally-aspirated gasoline engine. Although the first to fifth embodiments each have been provided with dual catalyst portions in the associated urea solution reformer, it is possible to provide only one catalyst portion, or three, four, or more catalyst portions. Moreover, in each of the sixth to eighth embodiments, the catalyst temperature sensor is provided in the catalyst casing at the exhaust-gas inlet side of the selective catalytic reduction catalyst, however it is also possible to provide a catalyst temperature sensor in the catalyst casing at an exhaust-gas outlet side of the selective catalytic reduction catalyst, or to provide catalyst temperature sensors in the catalyst casing at both an exhaust-gas inlet side and an exhaust-gas outlet side of the selective catalytic reduction catalyst, respectively, insofar as capable of detecting a temperature(s) related to the selective catalytic reduction catalyst.

EXAMPLE

Examples of the present invention will be described hereinafter in detail, together with Comparative Examples.

Example 1

As shown in FIG. 2, the selective catalytic reduction catalyst 51 was provided in the exhaust pipe 12 of the diesel engine 11 of in-line six-cylinder type with turbocharger and having a displacement of 8,000 cc. This selective catalytic reduction catalyst 51 was a copper-based catalyst fabricated by coating, a slurry containing a powder of zeolite ion-exchanged with copper, onto a honeycomb carrier. Further, the urea solution reformer 13 for decomposing the urea solution 18 to be reformed into the ammonia gas 22 was connected to the exhaust pipe 12 at the exhaust-gas upstream side of the selective catalytic reduction catalyst 51, in a manner to insert the ammonia gas supply nozzle 24 of the urea solution reformer 13 into the exhaust pipe 12. As shown in FIG. 1 and FIG. 2, this urea solution reformer 13 includes: the carrier gas heating unit 16 for heating the carrier gas (air) supplied from the carrier gas tank (air tank) 14; the carrier gas injecting nozzle 17 for injecting the carrier gas heated by the carrier gas heating unit 16; the first urea solution supply nozzle 21 for supplying the urea solution 18 to the tip end of the carrier gas injecting nozzle 17 so that the urea solution 18 is atomized by the carrier gas injected from the carrier gas injecting nozzle 17; the catalyst unit 23 for decomposing the atomized urea solution 18 and reforming it into the ammonia gas 22; and the ammonia gas supply nozzle 24 for supplying, the ammonia gas 22 discharged from the outlet of the catalyst unit 23, into the exhaust pipe 12 of the engine 11. The catalyst unit 23 comprised the first and second catalyst portions 23a, 23b, and was a catalyst fabricated by coating a slurry containing titania onto a honeycomb carrier. Further, the second urea solution supply nozzle 52 of the urea solution supply means 53 for supplying the urea solution 18 was provided in the exhaust pipe 12 at the exhaust-gas upstream side of the ammonia gas supply nozzle 24. Here, this exhaust gas purifier was regarded as Example 1.

Comparative Example 1

This was configured in the same manner as Example 1, except for omission of provision of a urea solution reformer. This exhaust gas purifier was regarded as Comparative Example 1.

Figure 17:
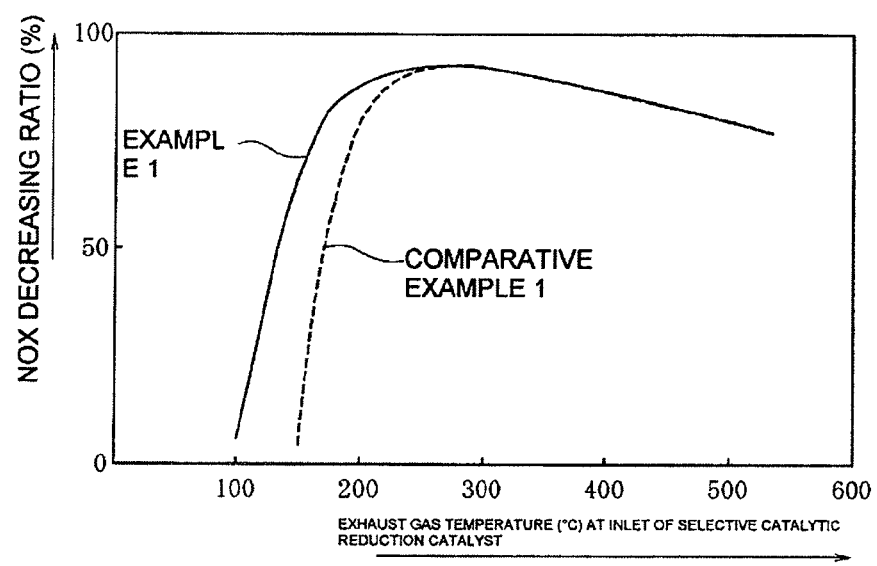
FIG. 17 is a graph showing a change of an $NO_x$ decreasing ratio relative to a change of an exhaust gas temperature, in case of adopting exhaust gas purifiers of Example 1 and Comparative Example 1.

Comparative Test 1 and Evaluation $NO_x$ decreasing ratios in Example 1 and Comparative Example 1 were measured, respectively, in a manner that a temperature of an exhaust gas exhausted from an exhaust pipe of the applicable engine was gradually elevated from 100° C. to 550° C., while changing the rotational speed and load of the engine. The results are shown in FIG. 17. It is noted that, in case of the exhaust gas purifier of Example 1, while the exhaust gas temperature was from 100 to 200° C., the urea solution reformer was driven to supply an ammonia gas from the ammonia gas supply nozzle into the exhaust pipe, and when the exhaust gas temperature exceeded 200° C., the urea solution supply means was driven to supply a urea solution from the second urea solution supply nozzle into the exhaust pipe. Further, in case of the exhaust gas purifier of Comparative Example 1, while the exhaust gas temperature was from 100 to 550° C. the urea solution supply means was driven to supply a urea solution from the second urea solution supply nozzle into the exhaust pipe.

As apparent from FIG. 17, it has been revealed that, although it was substantially impossible for the exhaust gas purifier of Comparative Example 1 to purify $NO_x$ in an exhaust gas while the exhaust gas temperature was from 100 to 150° C., the efficiency for purifying $NO_x$ was immediately increased along with elevation of temperature in the exhaust gas purifier of Example 1 while the exhaust gas temperature was from 100 to 150° C. Further, it has been also revealed that, although the efficiency for purifying $NO_x$ in the exhaust gas was started to be increased in the exhaust gas purifier of Comparative Example 1 only when the exhaust gas temperature exceeded 150° C., the efficiency for purifying $NO_x$ in the exhaust gas had already increased up to 80% or more in the exhaust gas purifier of Example 1 when the exhaust gas temperature exceeded 150° C.

Field of Utilization in Industry

The urea solution reformer and the exhaust gas purifier adopting the same are each utilizable in decomposing a urea solution to reform it into an ammonia gas by the urea solution reformer, and in using the ammonia gas reformed by the urea solution reformer as a reducing agent for the exhaust gas purifier to purify $NO_x$ in an exhaust gas from an engine.

The invention claimed is:

1. A urea solution reformer, comprising:
   a carrier gas heating unit for heating a carrier gas supplied from a carrier gas source;
   a carrier gas injecting nozzle for injecting the carrier gas heated by the carrier gas heating unit;
   a first urea solution supply nozzle for supplying a urea solution to a tip end of the carrier gas injecting nozzle so that the urea solution is atomized by the carrier gas injected from the carrier gas injecting nozzle;
   a catalyst unit provided to face toward the carrier gas injecting nozzle, to decompose the atomized urea solution to reform it into an ammonia gas; and
   an ammonia gas supply nozzle attached to an exhaust pipe of an engine so as to supply the ammonia gas discharged from an outlet of the catalyst unit into the exhaust pipe.

2. The urea solution reformer according to claim 1, wherein the carrier gas heating unit, the carrier gas injecting nozzle, the first urea solution supply nozzle, and the catalyst unit are accommodated in the reformer housing, and
   wherein the reformer housing is connected to a proximal end of the ammonia gas supply nozzle.

3. The urea solution reformer according to claim 1, wherein the carrier gas heating unit comprises: a coil holding portion formed in a columnar shape; an electrothermal coil buried in and along an outer peripheral surface of the coil holding portion such that the electrothermal coil is not exposed on the outer peripheral surface of the coil holding portion; and a carrier gas flow passage-oriented coil helically wound around the outer peripheral surface of the coil holding portion, so as to form a carrier gas flow passage for causing the carrier gas to helically flow along the outer peripheral surface of the coil holding portion.

4. The urea solution reformer according to claim 1, further comprising a dispersion plate with multiple through-holes and provided at an outlet side of the catalyst unit to oppose to an outlet face of the catalyst unit, in a manner to receive the urea solution discharged from the catalyst unit.

5. The urea solution reformer according to claim 1, further comprising catalyst heating means inserted in the catalyst unit and being capable of directly heating the catalyst unit.

6. An exhaust gas purifier adopting the urea solution reformer according to claim 1 in a manner to purify an exhaust gas of an engine, where the exhaust gas purifier is comprising:
   a selective catalytic reduction catalyst provided in an exhaust pipe of the engine, and being capable of reducing $NO_x$ in the exhaust gas into $N_2$;
   the urea solution reformer, including the ammonia gas supply nozzle engaged into the exhaust pipe at an exhaust-gas upstream side of the selective catalytic reduction catalyst, in a manner to supply an ammonia gas acting as a reducing agent for the selective catalytic reduction catalyst, from the ammonia gas supply nozzle into the exhaust pipe;
   urea solution supply means including a second urea solution supply nozzle engaged into the exhaust pipe at an exhaust-gas upstream side of the selective catalytic reduction catalyst and at an exhaust-gas upstream side or exhaust-gas downstream side of the ammonia gas supply nozzle, so as to supply the urea solution from the second urea solution supply nozzle into the exhaust pipe;
   a temperature sensor for detecting a temperature of an exhaust gas related to the selective catalytic reduction catalyst; and
   a controller for controlling the urea solution reformer and the urea solution supply means, based on a detection output of the temperature sensor.

7. An exhaust gas purifier for purifying an exhaust gas of an engine, comprising:
   a selective catalytic reduction catalyst provided in an exhaust pipe of the engine, and being capable of reducing $NO_x$ in the exhaust gas into $N_2$;
   a urea solution reformer for heating a urea solution by a heater to reform the urea solution into an ammonia water;
   urea solution supply means for supplying the urea solution to the urea solution reformer;
   an injecting nozzle engaged into the exhaust pipe at an exhaust-gas upstream side of the selective catalytic reduction catalyst, and being capable of injecting one or both of an ammonia water reformed by the urea solution reformer, and the urea solution passed through the urea solution reformer without being reformed thereby;
   a catalyst temperature sensor for detecting a temperature of an exhaust gas related to the selective catalytic reduction catalyst;
   a pressure sensor for detecting an inlet pressure of the urea solution reformer; and
   a controller for controlling the heater and the urea solution supply means, based on the respective detection outputs of the catalyst temperature sensor and the pressure sensor.

8. The exhaust gas purifier according to claim 7, wherein the urea solution reformer comprises: a reformation casing in a cylindrical shape; a heater helically wound around an outer peripheral surface of the reformation casing; and multiple inorganic porous bodies filled in the reformation casing, thereby transmitting a heat of the heater into the interior of the reformation casing.

9. The exhaust gas purifier according to claim 8, wherein the urea solution reformer further comprises partition plates provided in the reformation casing at predetermined intervals in a longitudinal direction of the reformation casing;
   wherein the interior of the reformation casing is divided by the partition plates into multiple spaces communicated with one another;
   wherein the multiple inorganic porous bodies are filled in the multiple spaces; and
   wherein the urea solution reformer is so configured that the urea solution flowed into the reformation casing is caused to pass therethrough while meandering through the multiple spaces, in a manner to be reformed into the ammonia water.

10. The exhaust gas purifier according to claim 8, wherein the inorganic porous bodies carry thereon catalysts, for promoting hydrolysis of the urea solution.

11. The exhaust gas purifier according to claim 7, wherein the urea solution reformer includes: a heater in a rod shape; a reducing agent flow pipe helically wound around an outer peripheral surface of the heater, and configured to allow a urea solution to flow through the pipe itself and configured to transmit a heat of the heater to an inner surface of the pipe itself; and an adsorbent layer coated on an inner peripheral surface of the reducing agent flow pipe, to adsorb the urea solution.

12. The exhaust gas purifier according to claim 11, wherein the adsorbent layer carries thereon a catalyst for promoting hydrolysis of the urea solution.

* * * * *